(12) United States Patent
Almudallal et al.

(10) Patent No.: US 11,133,707 B2
(45) Date of Patent: Sep. 28, 2021

(54) WIRELESS ELECTRIC FIELD POWER TRANSFER SYSTEM, TRANSMITTER AND RECEIVER

(71) Applicant: Solace Power Inc., Mount Pearl (CA)

(72) Inventors: Ahmad M. Almudallal, Mount Pearl (CA); Andrew Bartlett, Mount Pearl (CA)

(73) Assignee: SOLACE POWER INC., Mount Pearl (CA)

( * ) Notice: Subject to any disclaimer, the term of this patent is extended or adjusted under 35 U.S.C. 154(b) by 0 days.

(21) Appl. No.: 16/724,579

(22) Filed: Dec. 23, 2019

(65) Prior Publication Data

US 2020/0227941 A1 Jul. 16, 2020

Related U.S. Application Data

(60) Provisional application No. 62/791,185, filed on Jan. 11, 2019.

(51) Int. Cl.
*H02J 50/05* (2016.01)
*H01Q 9/16* (2006.01)
*H04B 5/00* (2006.01)

(52) U.S. Cl.
CPC ............ *H02J 50/05* (2016.02); *H01Q 9/16* (2013.01); *H04B 5/0012* (2013.01)

(58) Field of Classification Search
CPC ......... H02J 50/05; H04B 5/0012; H01Q 9/16; H01Q 1/248; H01Q 1/38; H01Q 9/065; H01Q 21/24
See application file for complete search history.

(56) References Cited

U.S. PATENT DOCUMENTS

| | | | |
|---|---|---|---|
| 9,653,948 B2 | 5/2017 | Polu et al. | |
| 9,979,206 B2 | 5/2018 | Nyberg et al. | |
| 2014/0327321 A1 | 11/2014 | Kusunoki et al. | |
| 2016/0072308 A1 | 3/2016 | Nyberg et al. | |
| 2016/0322867 A1 | 11/2016 | Polu et al. | |
| 2019/0027974 A1* | 1/2019 | Kanno | H02J 7/025 |
| 2020/0099254 A1 | 3/2020 | Bartlett et al. | |

FOREIGN PATENT DOCUMENTS

| | | | |
|---|---|---|---|
| JP | 2015-177651 A | 10/2015 | |
| JP | 2015177651 A | * 10/2015 | |

OTHER PUBLICATIONS

International Search Report and Written Opinion for PCT/CA2019/051859 dated Mar. 6, 2020.
David Griffiths, "Introduction to Electrodynamics," Third Edition, 1999, p. 147ff.

* cited by examiner

*Primary Examiner* — Ryan Johnson
(74) *Attorney, Agent, or Firm* — Harness, Dickey & Pierce, P.L.C.

(57) ABSTRACT

A resonator is provided. The resonator comprises at least two inductors and at least four capacitive electrodes electrically connected to the inductors. The capacitive electrodes and the inductors are configured to resonate and generate or couple with an electric field. The electrodes have either four fold mirror or rotational symmetry.

25 Claims, 25 Drawing Sheets

WIRELESS ELECTRIC FIELD POWER TRANSFER SYSTEM, TRANSMITTER AND RECEIVER

RELATED APPLICATION

This application claims the benefit of U.S. Provisional Application No. 62/791,185 filed on Jan. 11, 2019, the entire content of which is incorporated herein by reference.

FIELD

The subject application relates generally to wireless power transfer and in particular, to a wireless electric field power transfer system, and a transmitter and receiver therefor.

BACKGROUND

A variety of wireless power transfer systems are known. A typical wireless power transfer system includes a power source electrically connected to a wireless power transmitter, and a wireless power receiver electrically connected to a load. In magnetic induction systems, the transmitter has an induction coil that transfers electrical energy from the power source to an induction coil of the receiver. Power transfer occurs due to coupling of magnetic fields between the induction coils of the transmitter and receiver. The range of these magnetic induction systems is limited and the induction coils of the transmitter and receiver must be in optimal alignment for power transfer. There also exist resonant magnetic systems in which power is transferred due to coupling of magnetic fields between the induction coils of the transmitter and receiver. However, in resonant magnetic systems the induction coils are resonated using at least one capacitor. The range of power transfer in resonant magnetic systems is increased over that of magnetic induction systems and alignment issues are rectified.

In electrical induction systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. Resonant electric systems have an increased range of power transfer compared to that of electric induction systems and alignment issues are rectified.

Although wireless power transfer techniques are known, improvements are desired. It is therefore an object to provide a novel wireless electric field power transfer system, a transmitter and receiver therefor and a method of wirelessly transmitting power.

SUMMARY

It should be appreciated that this Summary is provided to introduce a selection of concepts in a simplified form that are further described below in the Detailed Description of Embodiments. This Summary is not intended to be used to limit the scope of the claimed subject matter.

Accordingly, in an aspect, there is provided a resonator comprising: at least two inductors; and at least four capacitive electrodes electrically connected to the inductors, and wherein the capacitive electrodes and the inductors are configured to resonate and: generate or couple with an electric field, wherein the electrodes have either four fold mirror or rotational symmetry.

In one or more embodiments, the electric field has a dipole term of negligible magnitude.

In one or more embodiments, two electrodes have a positive charge while two other electrodes have a negative charge. In one or more embodiments, a first electrode with the positive charge and a second electrode with the negative charge form a first dipole, and wherein a third electrode with the negative charge and a fourth electrode with the positive charge form a second dipole. In one or more embodiments, the first dipole is configured to generate or couple with an electric field having a dipole term in a first direction, wherein the second dipole is configured to generate or couple with an electric field having a dipole term in a second direction, and wherein the first and second directions are opposite. In one or more embodiments, the electric field having the dipole term in the first direction is equal in magnitude to the electric field having the dipole term in the second direction.

In one or more embodiments, the electrodes are planar square electrodes.

In one or more embodiments, the electrodes form a square at their peripheries.

In one or more embodiments, two electrodes are connected by a diagonal first connector and two other electrodes are connected by a diagonal second connector.

In another aspect, there is provided a system comprising: a transmitter comprising: a transmit resonator comprising: at least two inductors; and at least four capacitive electrodes electrically connected to the inductors, wherein the capacitive electrodes and the inductors are configured to resonate and generate an electric field having a dipole term of negligible magnitude; and a receiver comprising: a receive resonator comprising: at least two inductors; and at least four capacitive electrodes electrically connected to the inductors, wherein the capacitive electrodes and the inductors are configured to resonate and couple with the generated electric field having the dipole term of negligible magnitude to extract power.

In one or more embodiments, the transmitter further comprises a radiofrequency (RF) power source electrically connected to the transmit resonator. In one or more embodiments, the RF power source is a differential power source. In one or more embodiments, a first capacitive electrode of the transmit resonator is electrically connected to a first terminal of the differential power source via a first inductor of the transmit resonator, a second capacitive electrode of the transmit resonator is electrically connected to a second terminal of the differential power source via a second inductor of the transmit resonator, a third capacitive electrode of the transmit resonator is electrically connected to the second terminal of the differential power source via a third inductor of the transmit resonator, and a fourth capacitive electrode of the transmit resonator is electrically connected to the first terminal of the differential power source via a fourth inductor of the transmit resonator.

In one or more embodiments, a voltage applied to the first and fourth capacitive electrodes is opposite in sign and equal in magnitude to a voltage applied to the second and third capacitive electrodes.

In one or more embodiments, a first capacitive electrode of the transmit resonator is electrically connected to a fourth capacitive electrode of the transmit resonator via a first connector, a third capacitive electrode of the transmit resonator is electrically connected to a second capacitive electrode of the transmit resonator via a second connector, the first capacitive electrode is electrically connected to a first terminal of the differential power source via a first inductor of the transmit resonator, and the third capacitive electrode is electrically connected to a second terminal of the differential power source via a second inductor of the transmit resonator. In one or more embodiments, a voltage applied to the first and fourth capacitive electrodes is opposite in sign and equal in magnitude to a voltage applied to the second and third capacitive electrodes.

In one or more embodiments, the receiver further comprises a load electrically connected to the receive resonator.

In one or more embodiments, a first capacitive electrode of the receive resonator is electrically connected to a first terminal of the load via a first inductor of the receive resonator, a second capacitive electrode of the receive resonator is electrically connected to a second terminal of the load via a second inductor of the receive resonator, a third capacitive electrode of the receive resonator is electrically connected to the second terminal of the load via a third inductor of the receive resonator, and a fourth capacitive electrode of the receive resonator is electrically connected to the first terminal of the load via a fourth inductor of the receive resonator. In one or more embodiments, a voltage applied to the first and fourth capacitive electrodes is opposite in sign and equal in magnitude to a voltage applied to the second and third capacitive electrodes.

In one or more embodiments, a first capacitive electrode of the receive resonator is electrically connected to a fourth capacitive electrode of the receive resonator via a first connector, a third capacitive electrode of the receive resonator is electrically connected to a second capacitive electrode of the receive resonator via a second connector, the first capacitive electrode is electrically connected to a first terminal of the load via a first inductor of the receive resonator, and the third capacitive electrode is electrically connected to a second terminal of the load via a second inductor of the receive resonator. In one or more embodiments, a voltage applied to the first and fourth capacitive electrodes is opposite in sign and equal in magnitude to a voltage applied to the second and third capacitive electrodes.

In another aspect, there is provided a resonator comprising: at least two inductors; and at least eight capacitive electrodes electrically connected to the inductors, wherein the capacitive electrodes have three mirror symmetry planes, four-fold rotational symmetry and a mirror plane, or two mirror planes and a 90-degree screw axis, and wherein the electrodes and the inductors are configured to resonate.

In one or more embodiments, the electrodes and inductors resonate to generate or couple with an electric field having a dipole term and a quadrupole term of negligible magnitude.

BRIEF DESCRIPTION OF THE DRAWINGS

Embodiments will now be described more fully with reference to the accompanying drawings, in which.

DETAILED DESCRIPTION OF EMBODIMENTS

Figure 1:
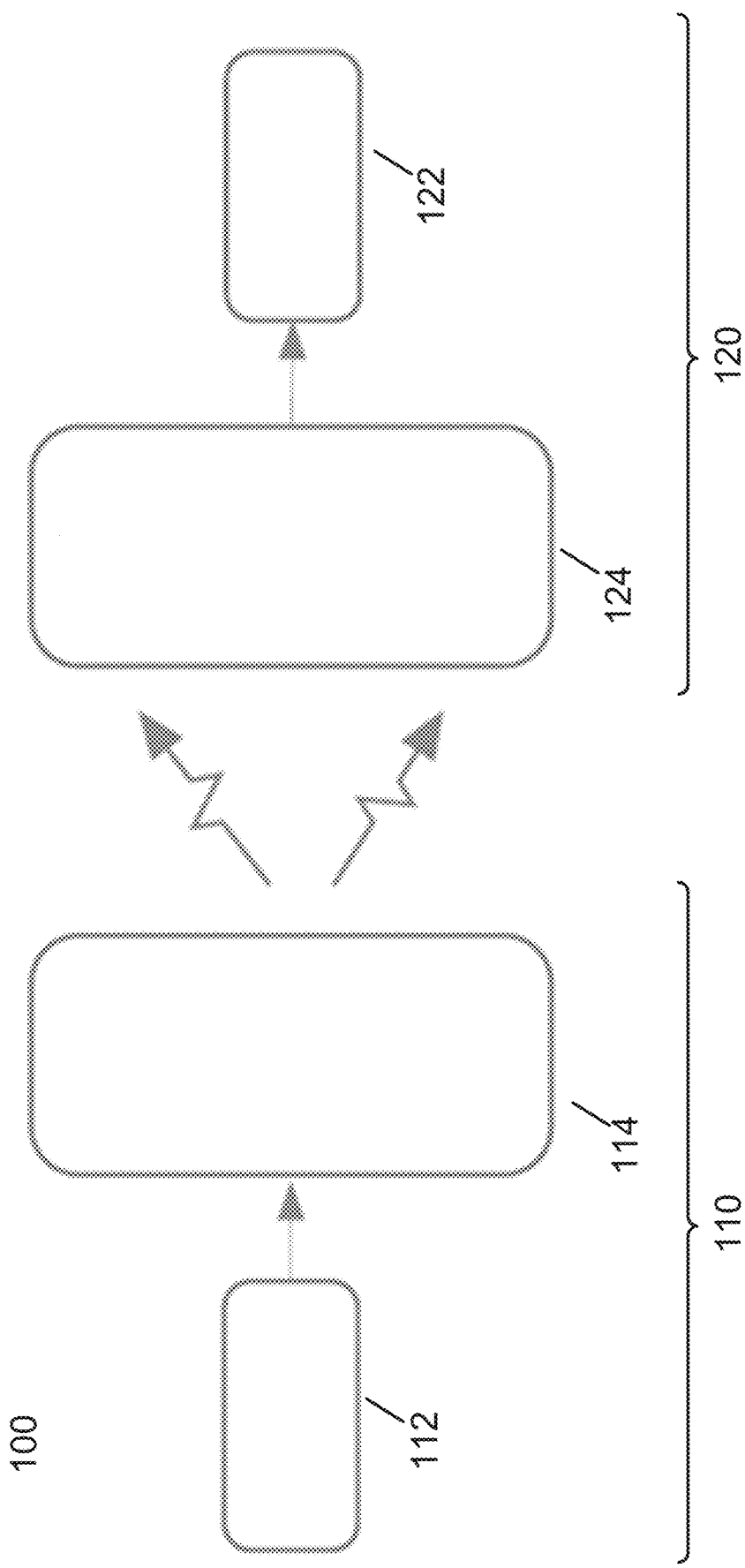
FIG. 1 is a block diagram of a wireless power transfer system.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property may further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

FIG. 1 shows a wireless power transfer system generally identified by reference numeral 100. The wireless power transfer system 100 comprises a transmitter 110 comprising a power source 112 electrically connected to a transmit element 114, and a receiver 120 comprising a receive element 124 electrically connected to a load 122. Power is transferred from the power source 112 to the transmit element 114. The power is then transferred from the transmit element 114 to the receive element 124 via resonant or non-resonant electric or magnetic field coupling. The power is then transferred from the receive element 124 to the load 122.

Figure 2:
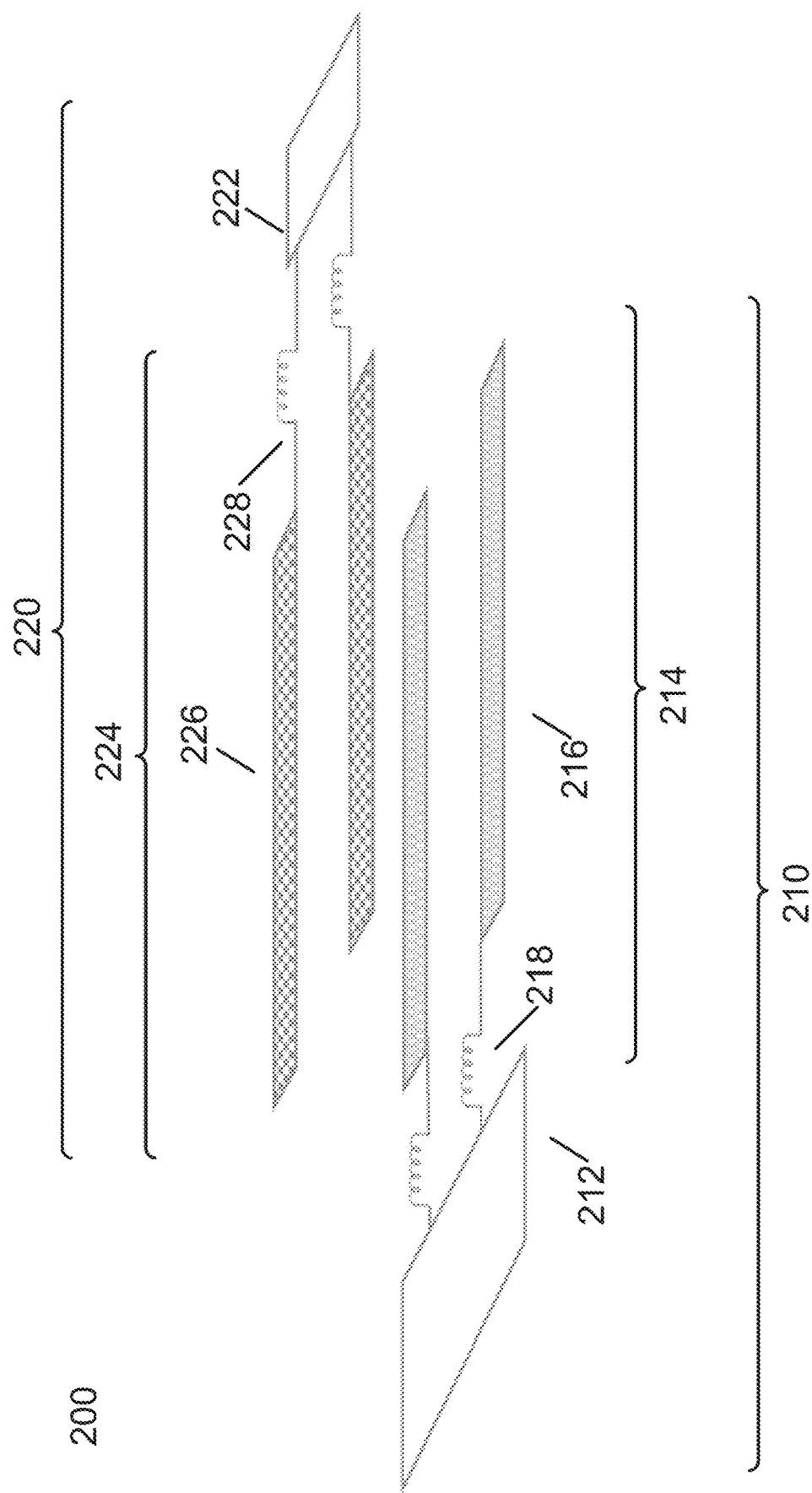
FIG. 2 is a schematic layout of a wireless resonant electric field power transfer system.

In one example embodiment, the wireless power transfer system may take the form of a resonant electric field wireless power transfer system. FIG. 2 shows a resonant electric field wireless power transfer system generally identified by reference numeral 200 such as that described in U.S. Pat. No. 9,653,948 to Polu et al. filed on Sep. 7, 2012, the relevant portions of which are incorporated herein by reference.

The resonant electric field wireless power transfer system 200 comprises a transmitter 210 comprising a power source 212 electrically connected to a transmit resonator 214. The transmit resonator 214 comprises a pair of laterally spaced, elongate transmit capacitive electrodes 216, each of which is electrically connected to the power source 212 via a transmit high Q inductor 218. The system 200 further comprises a receiver 220 comprising a receive resonator 224 electrically connected to a load 222. The receive resonator 224 is tuned to the resonant frequency of the transmit resonator 214. The receive resonator 224 comprises a pair of laterally spaced, elongate receive capacitive electrodes 226, each of which is electrically connected to the load 222 via a receive high Q inductor 228.

In this embodiment, the inductors 218 and 228 are ferrite core inductors. One of skill in the art however will appreciate that other cores are possible.

In this embodiment, each transmit and receive capacitive electrode 216 and 226 comprises an elongate element formed of electrically conductive material. The transmit capacitive electrodes 216 are coplanar. The receive capacitive electrodes 226 are coplanar. In this embodiment, the transmit capacitive electrodes 216 and the receive capacitive electrodes 226 are in parallel planes. In this embodiment, the transmit capacitive electrodes 216 and the receive capacitive electrodes 226 are in the form of generally rectangular, planar plates.

During operation, power is transferred from the power source 212 to the transmit capacitive electrodes 216 via the transmit high Q inductors 218. In particular, the power signal from the power source 212 that is transmitted to the transmit capacitive electrodes 216 via the transmit high Q inductors 218 excites the transmit resonator 214 causing the transmit resonator 214 to generate an electric field. When the receiver 220, which is tuned to the same resonant frequency as the transmitter 210, is placed within the resonant electric field, the receive resonator 224 extracts power from the transmit resonator 214 via resonant electric field coupling. The extracted power is then transferred from the receive resonator 224 to the load 222. As the power transfer is highly resonant, the transmit and receive capacitive electrodes 216 and 226 do not need to be as close together or as well aligned as is the case with the non-resonant electric field power transfer system.

While the transmit capacitive electrodes 216 and receive capacitive electrodes 226 have been described as laterally spaced, elongate electrodes, one of skill in the art will appreciate that other configurations are possible including, but not limited to, concentric, coplanar, circular, elliptical, disc, etc., electrodes. Other suitable electrode configurations are described in U.S. Pat. No. 9,979,206 to Nyberg et al. filed on Sep. 4, 2015, the relevant portions of which are incorporated herein by reference.

While the inductors 218 and 228 are shown as being connected in series to the power source 212 and the load 222, respectively, in FIG. 2, one of skill in the art will appreciate that the inductors 218 and 228 may be connected to the power source 212 and the load 222, respectively, in parallel.

The electric field generated by the transmit resonator 214 of the resonant electric field wireless power transfer system 200 may cause electromagnetic interference (EMI). Specifically, the electric field may couple with surrounding metal objects, interfere with the operation of other electronic systems and/or cause the wireless power transfer system 200 to fail regulatory emission requirements if the electric field is not controlled. An exemplary regulatory emission requirement is Canada's Innovation, Science and Economic Development (ISED's) Radio Standard Specification (RSS) 210 that limits the electric field strength for radios operating at 13.56 MHz at 30 m away from the transmitter to 15.848 mV/m.

Furthermore, a stray electric field may cause electric fields to be re-propagated at differing amplitudes and frequencies by metal structures surrounding the wireless power transfer system 200. The characteristics of such re-propagated (stray) electric fields depend upon the physical structure of the metallic surroundings. Therefore, the re-propagated electric fields may not be able to be controlled after the wireless power transfer system 200 is operated. However, the risk of re-propagated electric fields may be reduced by controlling the electric fields generated by the wireless power transfer system 200.

Figure 3:
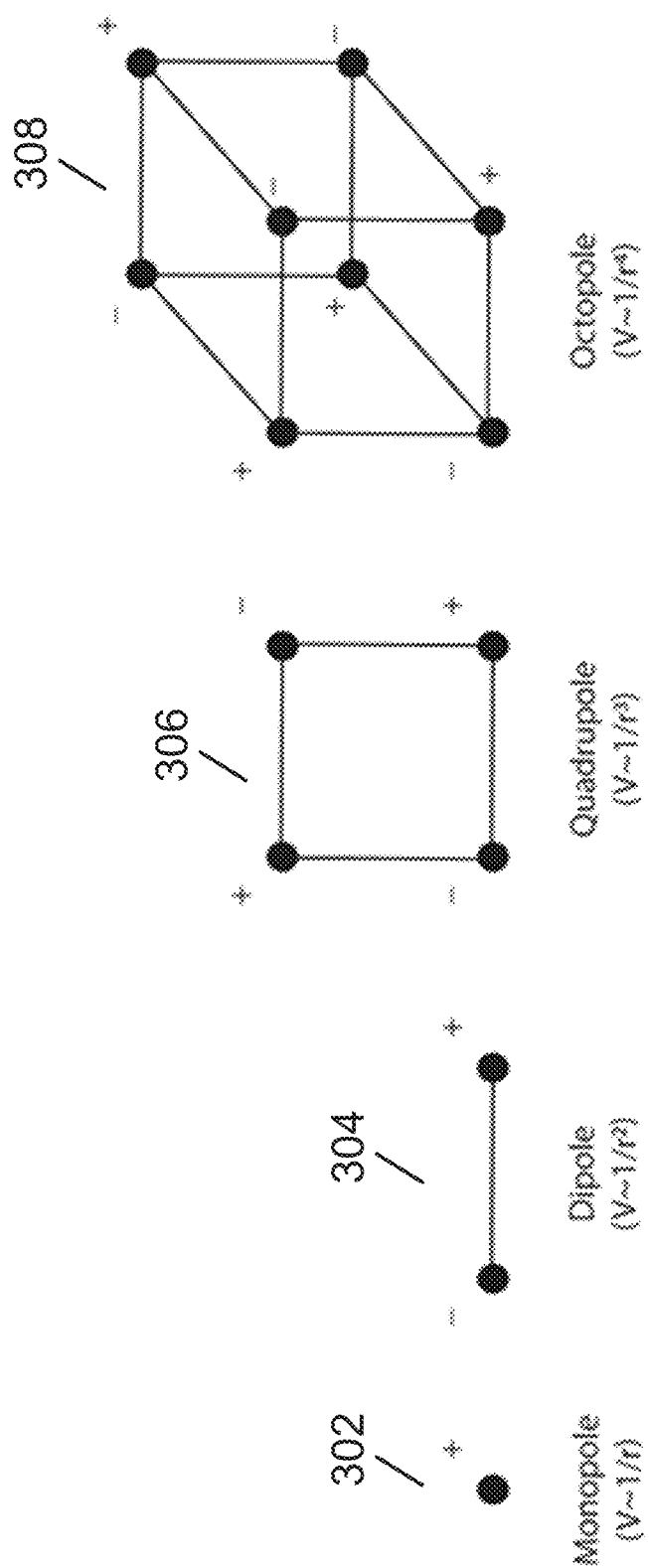
FIG. 3 is a schematic representation of electric field charge distributions.

In order to understand how the electric field generated by the transmit resonator 214 of the resonant electric field wireless power transfer system 200 may be controlled, an understanding of the electric fields is first needed. Generally, electric field generating electrodes, such as the transmit and receive capacitive electrodes 216 and 226, respectively, may be modelled as generating quasi-static fields with the assumption that the electrodes are electrically small. FIG. 3 shows a sequence of static point charge distributions. Starting with a zero dimensional charge distribution, a single static electrode may be modelled as generating a monopole charge distribution 302. The voltage (V) of the monopole charge distribution 302 is proportional to the inverse of the distance (r) from the center of the monopole charge distribution 302.

Increasing the dimensionality of the charge distribution to one, two static electrodes of opposite charge may be modelled as generating a dipole charge distribution 304. The voltage (V) of the dipole charge distribution 304 at distances much greater than the charge separation is proportional to the inverse of the square of the distance (r) from the center of the dipole charge distribution 304.

Increasing the dimensionality of the charge distribution to two, four static electrodes of alternating charge arranged in a square (as pictured in FIG. 3) may be modelled as generating a quadrupole charge distribution 306. The voltage (V) of the quadrupole charge distribution 306 at distances much greater than the charge separation is proportional to the inverse of the cube of the distance (r) from the center of the quadrupole charge distribution 306.

Increasing the dimensionality of the charge distribution to three, eight static electrodes of alternating charge arranged in a cube (as pictured in FIG. 3), may be modelled as generating an octupole (also spelled octopole and octapole) charge distribution 308. The voltage (V) of the octupole charge distribution 308 at distances much greater than the charge separation is proportional to the inverse of the fourth power of the distance (r) from the center of the octupole charge distribution 308. More information on monopole, dipole, quadrupole and octupole charge distributions 302, 304, 306 and 308, respectively, may be found on page 147ff of Introduction to Electrodynamics, Third Edition, authored by David J. Griffiths, 1999, the relevant portions of which are incorporated herein by reference.

In this embodiment, the side length of the charge distribution 304, 306 and 308 is a length (l). The characteristic length of the dipole charge distribution 304 is therefore l. The characteristic length of the quadrupole charge distribution 306 is $\sqrt{2}l$. The characteristic length of the octupole charge distribution 308 is $\sqrt{3}l$. The static electric potential (V) of an arbitrary charged object, such as an electrode, at a distance (r) much greater than the object's characteristic length may be expressed as a linear combination of the electric potentials (V) of the monopole charge distribution 302, dipole charge distribution 304, quadrupole charge distribution 306 and octupole charge distribution 308 using multipole expansion. Multipole expansion is a summation where each consecutive term is composed of the product of a constant and an incrementally increasing power of l/r. The static electric potential (V) at a distance (r) in multipole expansion is given by the following equation:

$$V(r) = \frac{\alpha_1}{r} + \frac{\alpha_2}{r^2} + \frac{\alpha_3}{r^3} + \frac{\alpha_4}{r^4} + \ldots$$

As shown in Equation 1, the first term in the summation is proportional to the potential (V) of the monopole charge distribution 302, the second term in the summation is proportional to the potential (V) of the dipole charge distribution 304, the third term in the summation is proportional to the potential (V) of the quadrupole charge distribution 306, the fourth term in the summation is proportional to the potential (V) of the octupole charge distribution 308 and so on. The parameters ($\alpha_1$, $\alpha_2$, $\alpha_3$, $\alpha_4$, ... ) are constants that are unique to the charge distribution of the particular object being modelled.

The multipole expansion of the potential (V) may be used to calculate the electric field (E) of an arbitrary object, such as an electrode. Generally, the electric field (E) at a distance (r) of an arbitrary object is given by the following gradient equation:

$$E = -\nabla V(r) \qquad \text{Equation 2}$$

Substituting Equation 1 into Equation 2 yields the electric field (E) in the form of a summation as given by the following equation:

$$E = \frac{\beta_1}{r^2} + \frac{\beta_2}{r^3} + \frac{\beta_3}{r^4} + \frac{\beta_4}{r^5} + \ldots$$

As shown in Equation 3, the first term in the summation represents the electric field (E) of the monopole charge distribution 302 and is proportional to $1/r^2$. The second term in the summation represents the electric field (E) of the dipole charge distribution 304 and is proportional to $1/r^3$. The third term in the summation represents the electric field (E) of the quadrupole charge distribution 306 and is proportional to $1/r^4$. The fourth term in the summation represents the electric field (E) of the octupole charge distribution 308 and is proportional to $1/r^5$. As previously stated, r is the distance to the center of the arbitrary object. The parameters ($\beta_1$, $\beta_2$, $\beta_3$, $\beta_4$, ... ) are constants.

Figure 4:
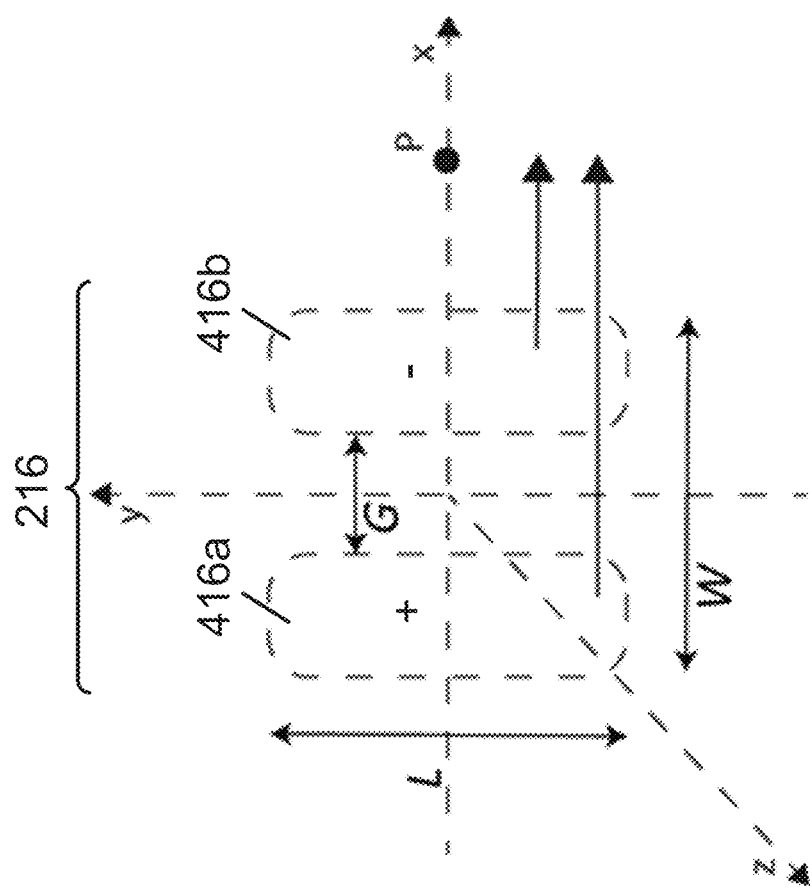
FIG. 4 is a plan view of transmit capacitive electrodes of the power transfer system of FIG. 2.

The electric field distributions shown in FIG. 3 may be used to model the capacitive electrodes 216 and 226 of the wireless power transfer system 200 shown in FIG. 2. FIG. 4 shows the transmit capacitive electrodes 216 of the system 200 in isolation. While the transmit capacitive electrodes 216 are shown with rounded corners, one of skill in the art will appreciate this is solely for illustrative purposes. The transmit capacitive electrodes 216 are coplanar in the x-y plane. The electric field generated by the transmit resonator 214 extends from the transmit capacitive electrodes 216 in all directions. Thus, power transfer through resonant electric field coupling between the transmit resonator 214 and the receive resonator 224 happens along the z-axis. The transmit capacitive electrodes 216 have a length (L). The two electrodes 216 are separated by a gap (G). The two electrodes 216 have a total end-to-end width (W).

At distances much greater than the characteristic length of the transmit capacitive electrodes 216, the transmit capacitive electrodes 216 may be modelled as the dipole charge distribution 304 with one transmit capacitive electrode 416a holding a positive charge and the other transmit capacitive electrode 416b holding a negative charge. Point P in FIG. 4 is located on the x-axis. Point P is located in a fringing field region of the electric field generated by the transmit resonator 214.

Point P is at a distance (r) from the centre of the transmit capacitive electrodes 216 that is greater than the characteristic length of the transmit capacitive electrodes 216. At point P the total electric field is non-zero and the previously discussed EMI issues may exist.

While the transmit capacitive electrodes 216 have been depicted and described in FIG. 4, one of skill in the art will appreciate, that the same depiction and description applies to the receive capacitive electrodes 226.

Figure 5A:
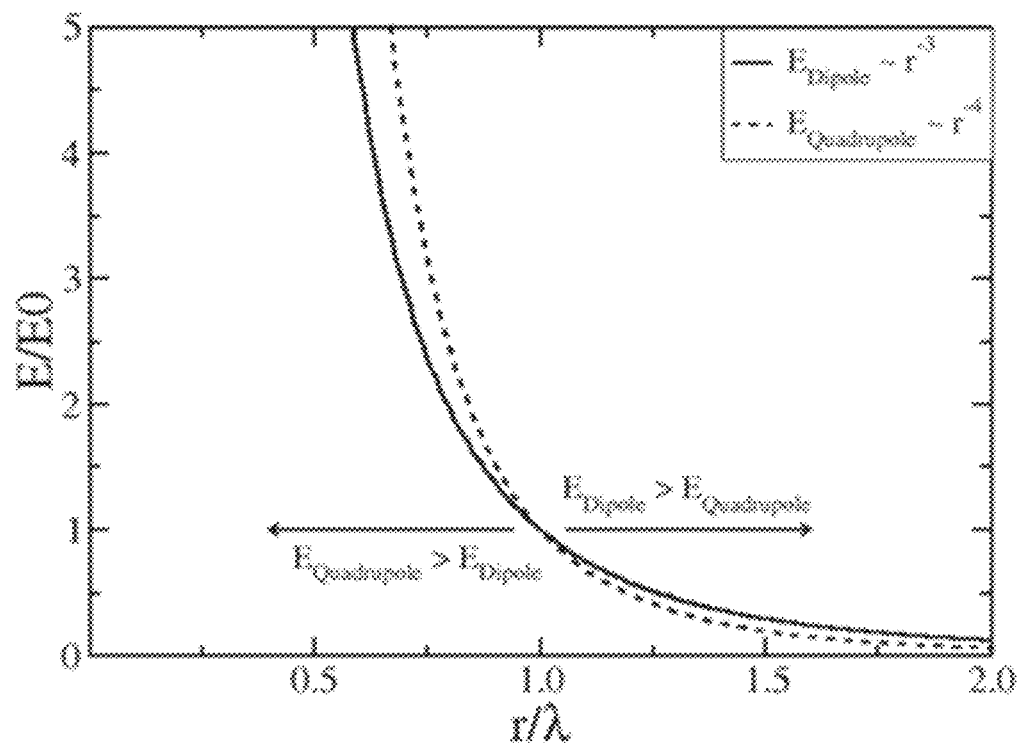
FIG. 5A is a graph of electric field intensity of dipole and quadrupole terms of FIG. 3 versus the ratio of a radius to a wavelength of the electric field.

FIG. 5A is a linear-linear graph of the second term in the summation ($\beta_2/r^3$) of Equation 3 which represents the electric field (E) of the dipole charge distribution 304 and the third term in the summation ($\beta_3/r^4$) of Equation 3 which represents the electric field (E) of the quadrupole charge distribution 306 versus the ratio of distance (r) to the wavelength ($\lambda$) of the electric field (E). For this comparison, the constants $\beta_2$ and $\beta_3$ are equal to Coulomb's constant ($E_0$). Coulomb's constant ($E_0$) is approximately $8.99 \times 10^{-9}$ N m$^2$ C$^{-2}$.

Figure 5B:
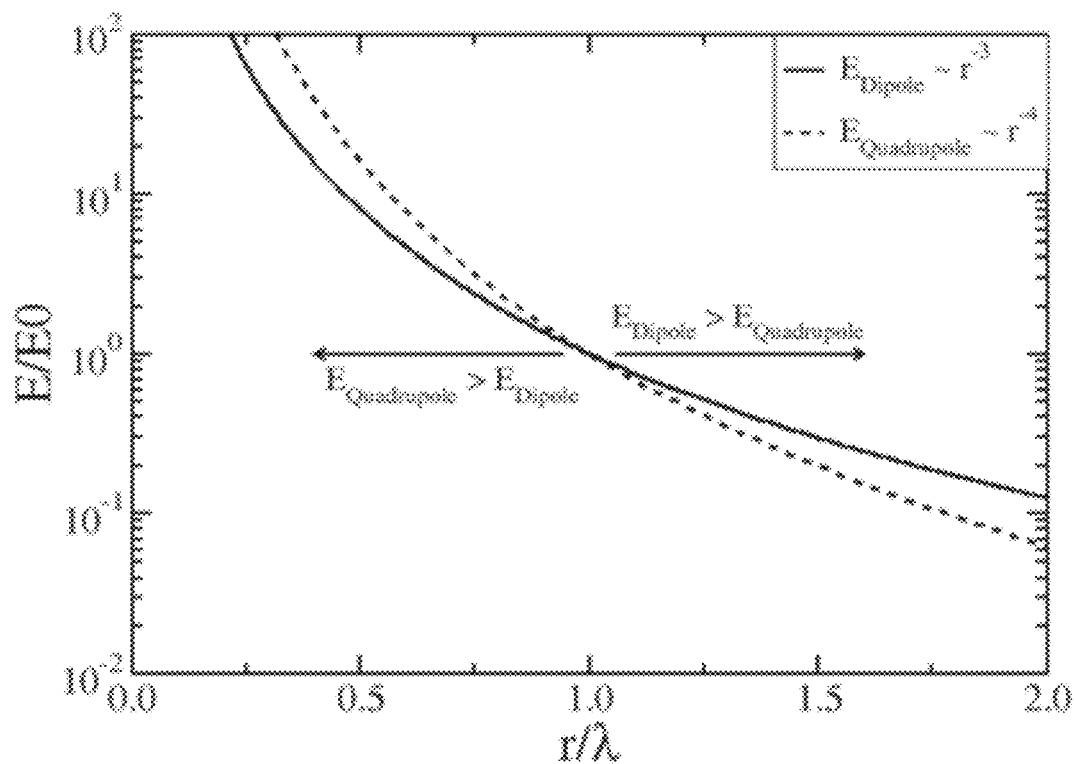
FIG. 5B is another graph of electric field intensity of dipole and quadrupole terms of FIG. 3 versus the ratio of a radius to a wavelength of the electric field.

FIG. 5B is a logarithmic-linear graph of the second term in the summation ($\beta_2/r^3$) of Equation 3 which represents the electric field (E) of the dipole charge distribution 304 and the third term in the summation ($\beta_3/r^4$) of Equation 3 which represents the electric field (E) of the quadrupole charge distribution 306 versus the ratio of distance (r) to the wavelength ($\lambda$) of the electric field (E). For this comparison, the constants $\beta_2$ and $\beta_3$ are equal to Coulomb's constant ($E_0$). Coulomb's constant ($E_0$) is approximately $8.99 \times 10^{-9}$ N m$^2$ C$^{-2}$.

As FIGS. 5A and 5B illustrate, the quadrupole term (the term proportional to the inverse of the fourth power of the distance (r)) is dominant at distances (r) less than the wavelength ($\lambda$). The dipole term (the term proportional to the inverse of the cube of the distance (r)) is dominant at distances (r) greater than the wavelength ($\lambda$).

As previously stated, electric fields generated by the wireless power transfer system 200 may cause EMI issues. As shown in FIGS. 5A and 5B, the transmit capacitive electrodes 216 of the transmit resonator 214 of the system 200 generate an electric field (E) that is dominated by the dipole term (the term proportional to the inverse of the cube of the distance (r)) at distances (r) greater than the wavelength ($\lambda$). Thus, referring back to FIG. 4, the electric field (E) at the point P, which is at a distance (r) from the centre of the capacitive electrodes 216 that is greater than the wavelength ($\lambda$) of the electric field (E), is non-zero and dominated by the dipole term for the transmit capacitive electrodes 216.

To minimize stray electric fields and issues such as EMI, capacitive electrodes that generate a localized electric field (E) are preferable i.e. the electric field amplitude is weak at distances beyond the wavelength ($\lambda$) of the electric field (E). Capacitive electrodes that generate an electric field (E) that contains a dipole term of negligible magnitude and higher order terms (quadrupole and octupole terms) of significantly greater magnitude will produce such a localized electric field (E). Such an electric field is proportional to higher order terms (e.g. quadrupole and octupole terms) and as such proportional to higher powers of the inverse distance (r) from the capacitive electrodes.

Figure 6A:
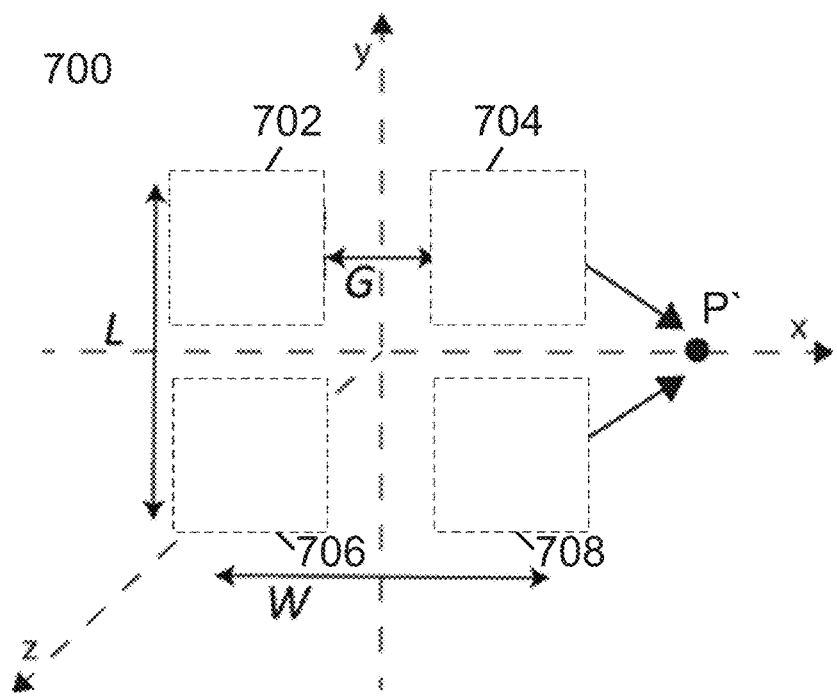
FIG. 6A is a plan view of a capacitive electrode assembly in accordance with an aspect of the disclosure.
Figure 6B:
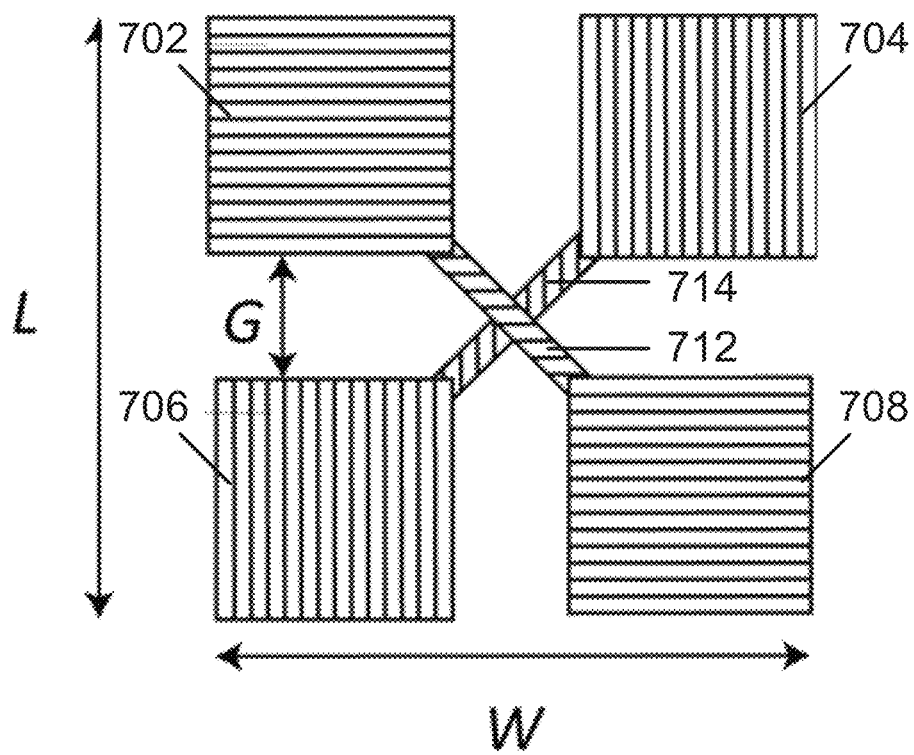
FIG. 6B is a plan view of the capacitive electrode assembly of FIG. 6A with connectors shown.

FIGS. 6A and 6B show such a capacitive electrode assembly generally identified by reference numeral 700. The capacitive electrode assembly 700 forms part of a resonator that is configured to generate or couple with an electric field (E) having a dipole term, the term proportional to the inverse of the cube of the distance (r), of negligible magnitude (near or at zero) and higher order terms (e.g. quadrupole and octupole terms) of significantly greater magnitude as will be described.

The capacitive electrode assembly 700 comprises four spaced apart co-planar plate electrodes. The capacitive electrode assembly 700 has a width (W) and a length (L). The electrodes of the assembly 700 are separated by a gap (G). In this embodiment, the assembly 700 has a square perimeter at the periphery of the electrodes. Thus, in this embodiment, the width (W) is equal to the length (L). The electrodes of the assembly 700 form a square at their peripheries.

In this embodiment, the four electrodes are all generally square plate electrodes. The electrodes have approximately identical dimensions. The four electrodes comprise a first electrode 702 in the upper left corner of the square formed by the electrodes, a second electrode 704 in the upper right corner, a third electrode 706 in the lower left corner and a fourth electrode 708 in the lower right corner. The electrodes 702, 704, 706 and 708 have four fold mirror and rotational symmetries. In this embodiment, the two mirror planes are the x-z and y-z planes, and the four fold rotational symmetry is about the z-axis.

In this embodiment, the assembly 700 further comprises connectors 712 and 714 that interconnect the electrodes. The first electrode 702 is electrically connected to the fourth electrode 708 via the first connector 712. The first connector 712 is directly electrically connected to the first and fourth electrodes 702 and 708, respectively. The second electrode 704 is electrically connected to the third electrode 706 via the second connector 714. The second connector 714 is directly electrically connected to the second and third electrodes 704 and 706, respectively.

Diagonal electrodes carry like charges. Adjacent electrodes hold opposite charges. The connectors 712 and 714 connect electrodes with like charges. The sign of the charge will flip twice per cycle of a power signal (i.e. 27.12 million times a second for a 13.56 MHz power signal) as will be described. Specifically, the first electrode 702 and the fourth electrode 708 hold positive charges when the second electrode 704 and the third electrode 706 hold negative charges. In this instance, the first connector 712 connects the first electrode 702 and the fourth electrode 708, and is similarly positively charged while the second connector 714 connects the second electrode 704 and the third electrode 706, and is similarly negatively charged. When the sign of the charge flips, the first electrode 702 and the fourth electrode 708 hold negative charges when the second electrode 704 and the third electrode 706 hold positive charges. In this instance, the first connector 712 connects the first electrode 702 and the fourth electrode 708, and is similarly negatively charged while the second connector 714 connects the second electrode 704 and the third electrode 706, and is similarly positively charged.

As previously stated, the connectors 712 and 714 carry opposite charges. Therefore, the intensity of the electric field (E) is high between connectors 712 and 714. In this embodiment, a dielectric is positioned in the overlapping region between the connectors 712 and 714. The overlapping region is the region in which the connectors 712 and 714 overlap in the z-axis. As one of skill in the art will appreciate, the dielectric may extend beyond the overlapping region between the connectors 712 and 714. The dielectric is positioned between the connectors 712 and 714 to insulate the connectors 712 and 714 from each other. In this embodiment, the dielectric has a dielectric constant of 2 to 4 and a tangent loss of less than 0.01. Exemplary dielectric materials include Roger 4350B and FR4 laminate, Teflon®, and polyethylene (PE).

As one of skill in the art will appreciate, the connectors 712 and 814 and/or electrodes 702, 704, 706 and 708 may be printed on either side of the dielectric such as a PCB.

Point P' is located on the x-axis. Point P' represents a fringing field region of the electric field generated by the electrode assembly 700 as will be described. Point P' is in the x-y plane at a distance (r) from the centre of the electrode assembly 700 that is greater than the characteristic length of the electrode assembly 700. At point P' the total electric field is approximately zero as will be described.

Figure 7:
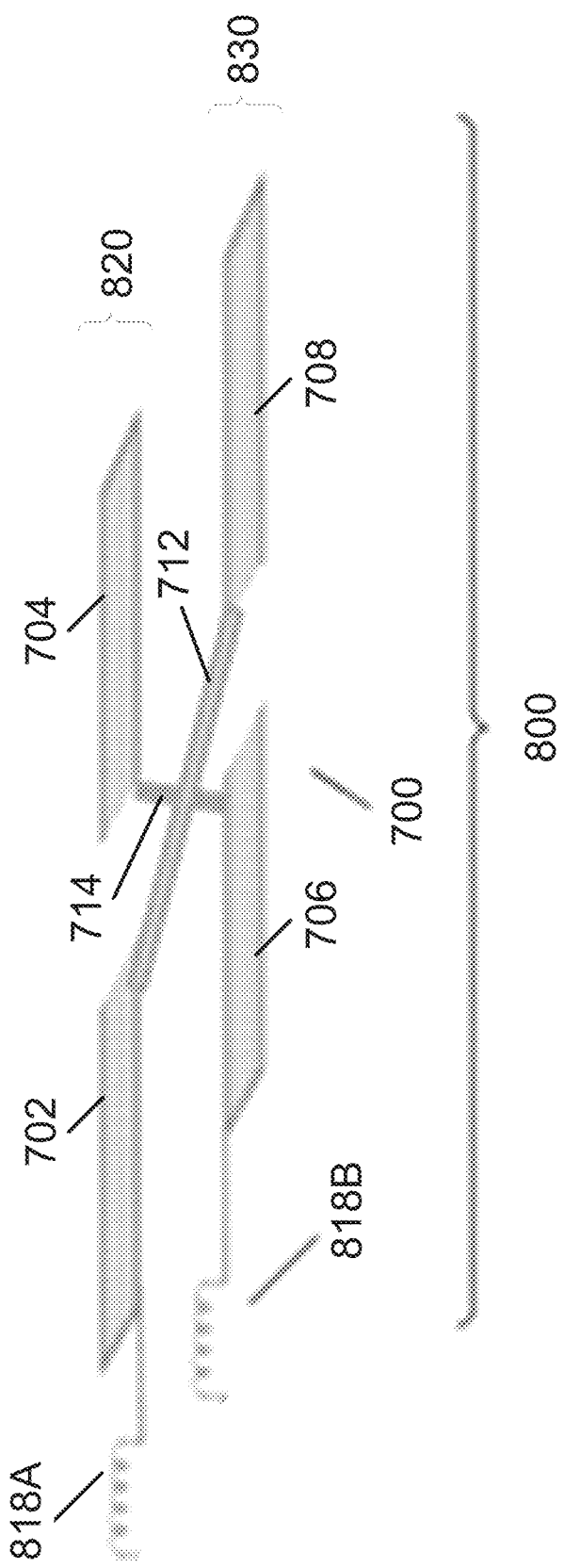
FIG. 7 is a schematic layout of a transmit resonator in accordance with an aspect of the disclosure.

As previously stated, the capacitive electrode assembly 700 forms part of a resonator that is configured to generate or couple with an electric field (E) having a dipole term, the term proportional to the inverse of the cube of the distance (r), of negligible magnitude (near or at zero) and higher order terms (e.g. quadrupole and octupole terms) of significantly greater magnitude. FIG. 7 shows the capacitive electrode assembly 700 as part of a transmit resonator generally identified by reference numeral 800. The transmit resonator 800 is configured to generate an electric field (E) having a dipole term, the term proportional to the inverse of the cube of the distance (r), of negligible magnitude (near or at zero) and higher order terms (e.g. quadrupole and octupole terms) of significantly greater magnitude to produce a localized electric field (E). The transmit resonator 800 comprises the capacitive electrode assembly 700 electrically connected to a first inductor 818A at a first terminal and electrically connected to a second inductor 818B at a second terminal.

The first electrode 702 is electrically connected to the fourth electrode 708 via the first connector 712. The second electrode 704 is electrically connected to the third electrode 706 via the second connector 714. The first electrode 702 is electrically connected to the first inductor 818A. The third electrode 706 is electrically connected to the second inductor 818B.

As previously stated, the charge of the first electrode 702, first connector 712 and fourth electrode 708 is positive when the charge of the second electrode 704, second connector 714 and third electrode 706 is negative. Similarly, the charge of the first electrode 702, first connector 712 and fourth electrode 708 is negative when the charge of the second electrode 704, second connector 714 and third electrode 706 is positive. The first electrode 702 and the second electrode 704 which is oppositely charged to the charge of the first electrode 702, form a first dipole 820. The third electrode 706 and the fourth electrode 708 which is oppositely charged to the charge of the third electrode 706, form a second dipole 830.

The first dipole 820 is configured to generate an electric field (E) having a dipole term in a first direction. The second dipole 830 is configured to generate an electric field (E) having a dipole term in a second direction. The dipole terms of the electric fields (E) generated by the dipoles 820 and 830 are equal in magnitude as the electrodes 702, 704, 706 and 708 and connectors 712 and 714 have identical (or near identical) dimensions. The first and second directions are opposite in the x-axis as the charge distribution of the dipoles 820 and 830 is opposed. Thus, the dipole terms of the electric fields (E) generated by the dipoles 820 and 830 are equal in magnitude and opposite in direction resulting in a net zero dipole term of the net electric field (E) generated by the dipoles 820 and 830.

The first electrode 702 and the third electrode 706 which is oppositely charged to the charge of the first electrode 702, form a third dipole. The second electrode 704 and the fourth electrode 708 which is oppositely charged to the charge of the second electrode 704, form a fourth dipole. The dipole moments of the third and fourth dipoles are equal in magnitude and antiparallel along the y-axis.

As the net dipole term of the electric field (E) generated by the transmit resonator 800 is approximately zero, the total electric field (E) at a fringing field region (e.g. at Point P') is approximately zero. The fringing field region is at a distance (r) from the centre of the electrode assembly 700.

Figure 8A:
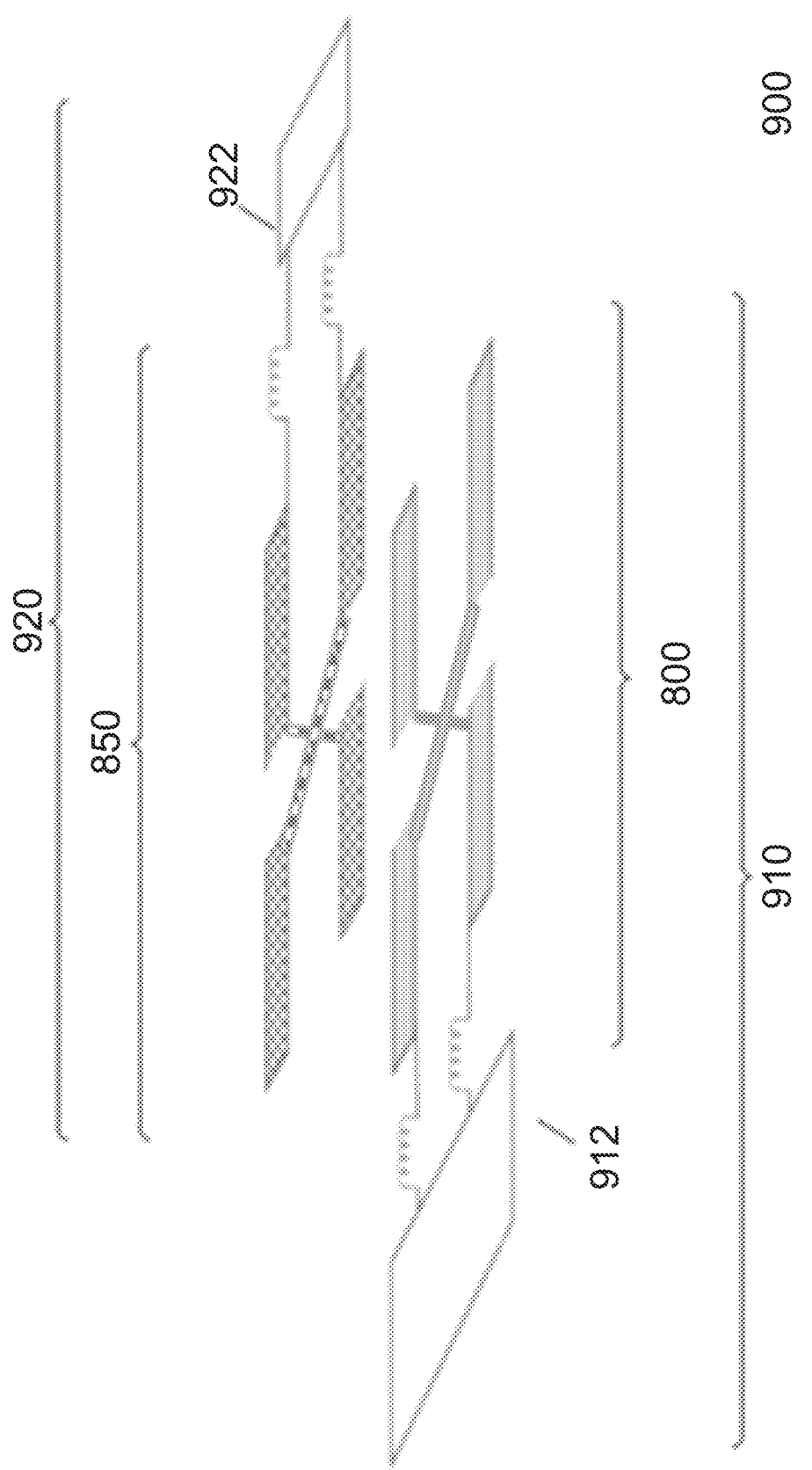
FIG. 8A is a schematic layout of a wireless power transfer system in accordance with an aspect of the disclosure.

FIG. 8A shows a wireless power transfer system generally identified by reference numeral 900. The transmit resonator 800 forms part of the wireless power transfer system 900. The wireless power transfer system 900 comprises a transmitter 910 and a receiver 920. The transmitter 910 is configured to generate an electric field to transfer power from the transmitter 910 to the receiver 920. The receiver 920 is configured to extract power from the electric field generated by the transmitter 910 via resonant electric field coupling.

The transmitter 910 comprises the transmit resonator 800 electrically connected to a power source 912. In this embodiment, the power source 912 is in the form of a differential RF power source. The RF power source 912 includes an inverter configured to transform the DC-signal within the RF power source 912 into an AC-signal. Each terminal of the transmit resonator 800 is electrically connected to a terminal of the RF power source 912. Specifically, the first electrode 702 is electrically connected to a first terminal of the differential RF power source 912 via the first inductor 818A. The third electrode 706 is electrically connected to a second terminal of the differential RF power source 912 via the second inductor 818B.

The receiver 920 comprises a receive resonator 850 electrically connected to a load 922. The receive resonator 850 is configured to extract power from a generated electric field (E) having a dipole term, the term proportional to the inverse of the cube of the distance (r), of negligible magnitude (near or at zero) and higher order terms (e.g. quadrupole and octupole terms) of significantly greater magnitude. The receiver resonator 850 is identical to the transmit resonator 800 previously described and will not be described in more detail.

During operation, power is transferred via resonant electric field coupling as previously stated along the z-axis. Power is transferred from the power source 912 to electrodes of the electrode assembly 700 via the inductors 818A and 818B. In particular, the power signal from the power source 912 that is transmitted to the electrodes 702, 704, 706 and 708 via the inductors 818A and 818B excites the transmit resonator 800 causing the transmit resonator 800 to generate an electric field (E). When the receiver 920, which is tuned to the same resonant frequency as the transmitter 910, is placed within the electric field (E), the receive resonator 850 extracts power from the transmit resonator 800 via resonant electric field coupling. While the transmit resonator 800 may generate a magnetic field as well, little, if any, power is transferred via magnetic field coupling. The extracted power is then transferred from the receive resonator 850 to the load 922.

As previously stated, the transmit resonator 800 is configured to generate an electric field (E) that contains a dipole term of negligible magnitude and higher order terms (e.g. quadrupole and octupole terms) of significantly greater magnitude to produce a localized electric field (E). The electrode assembly 700 of the transmit resonator 800 increases the capacitance of the transmit resonator 800 of which it is a part of. Furthermore, the electrode assembly 700 decreases the mutual coupling between the transmit and receive resonators 800 and 850, respectively of the wireless power transfer system 900. Increasing the capacitance of the transmit resonator 800 and decreasing the mutual coupling between the resonators 800 and 850 reduces the range over which high efficiency wireless power transfer may be achieved. The electrode assembly 700 also reduces the required inductance of the inductors 818A and 818B of the transmit resonator 800 and the inductors of the receive resonator 850 compared to the inductors 218 and 228 of the system 200 shown in FIG. 2. This is desirable as inductors are large in volume, heavy, prone to heating, and difficult to manufacture.

Figure 8B:
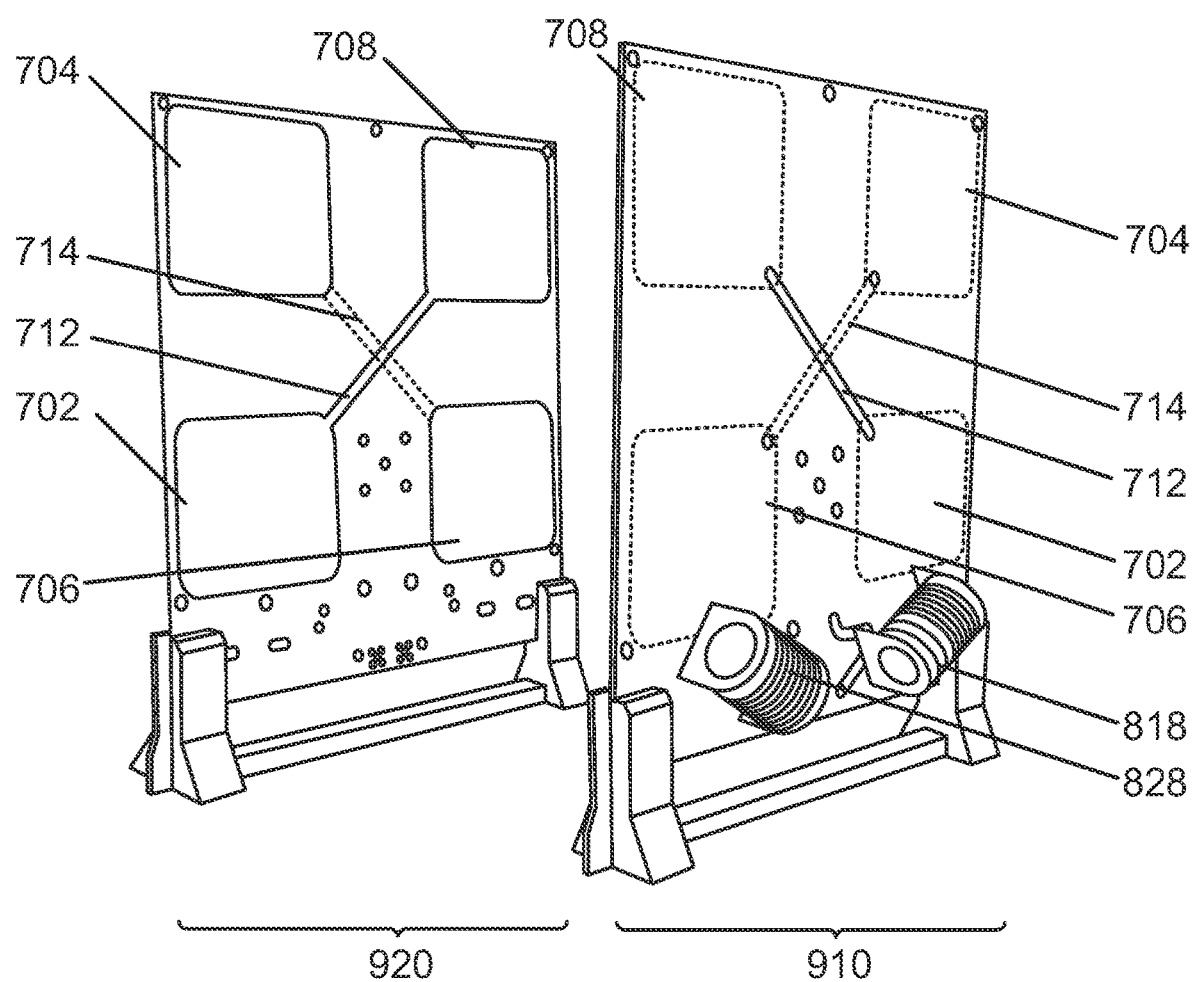
FIG. 8B is a perspective view of an experimental prototype of the wireless power transfer system of FIG. 8A.

An experimental prototype of the wireless power transfer system 900 was manufactured. FIG. 8B shows the experimental manufactured version of the wireless power transfer system 900. In this embodiment, the electrode assemblies 700 of the resonators 800 and 850 of the system 900 are on a printed circuit board (PCB). One of the connectors 712 and 714 is on one major side of the PCB and the other of the connectors 712 and 714 is on the other opposite major side of the PCB. The PCB is made of FR-408 material and has 0.16 cm thickness. The length (L) and width (W) of the electrode assembly 700 of the resonators 800 and 850 are both 20 cm. The gap (G) between the electrodes of the assembly 700 is 5 cm. The width of the connectors 712 and 714 is 0.5 cm. All electrodes and connectors 712 and 714 of the assemblies 700 are made of copper.

The resonant frequency of the resonators 800 and 850 is 13.56 MHz. The inductors 818A and 818B of the resonators 800 and 850 are air core inductors. Each resonator 800 and 850 was tuned at 13.56 MHz which required 17.8 µH split into the two air core inductors.

Figure 9:
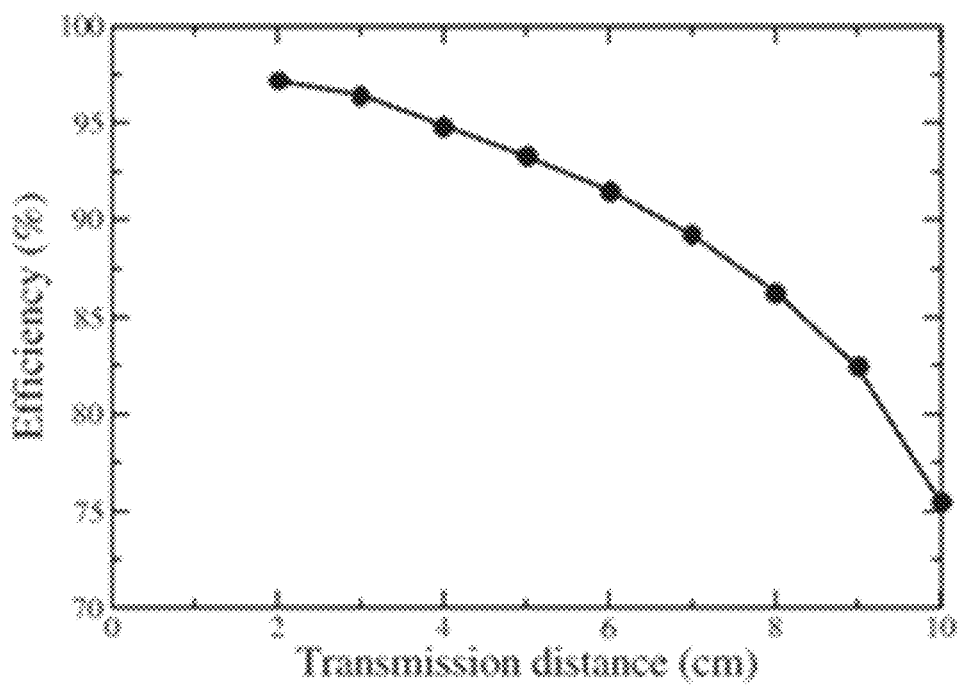
FIG. 9 is a graph of the radiofrequency (RF) efficiency of the system of FIG. 8B.
Figure 10:
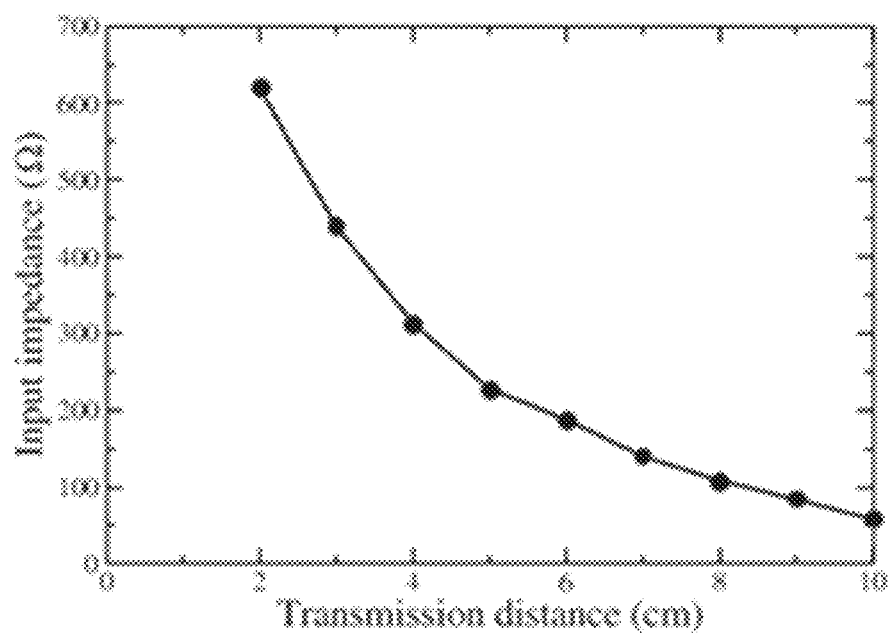
FIG. 10 is a graph of the input impedance of the system of FIG. 8B.

Experimental measurements were obtained on the wireless power transfer system 900. The results of these experiments are shown in FIGS. 9 and 10. FIG. 9 shows the RF efficiency of the wireless power transfer system 900 as a function of distance between the transmit resonator 800 and receive resonator 850. The distance between the resonators 800 and 850 is defined as the transmission distance. The RF efficiency of the system 900 is defined as the efficiency of the wireless power transfer between the resonators 800 and 850. As shown in FIG. 9, the RF efficiency is above 90% when the separation distance is less than or equal to 6 cm. The RF efficiency decreases as the transmission distance increases.

FIG. 10 shows the input impedance of the wireless power transfer system 900 as a function of the transmission distance. As shown in FIG. 10, the input impedance is over 600Ω when the transmission distance is 2 cm. The input impedance decreases as the transmission distance increases.

Simulations were performed comparing the performance of the electrode assembly 700 in the wireless power transfer system 900 and the transmit capacitive electrodes 216 in the wireless power transfer system 200. The results of these simulations are shown in FIGS. 11 to 16. For ease of reference, simulation results for the system 200 with the capacitive transmit electrodes 216 are referred to as "Dipole" and simulation results for the system 900 with the electrode assembly 700 are referred to as "Quadrupole".

Figure 11:
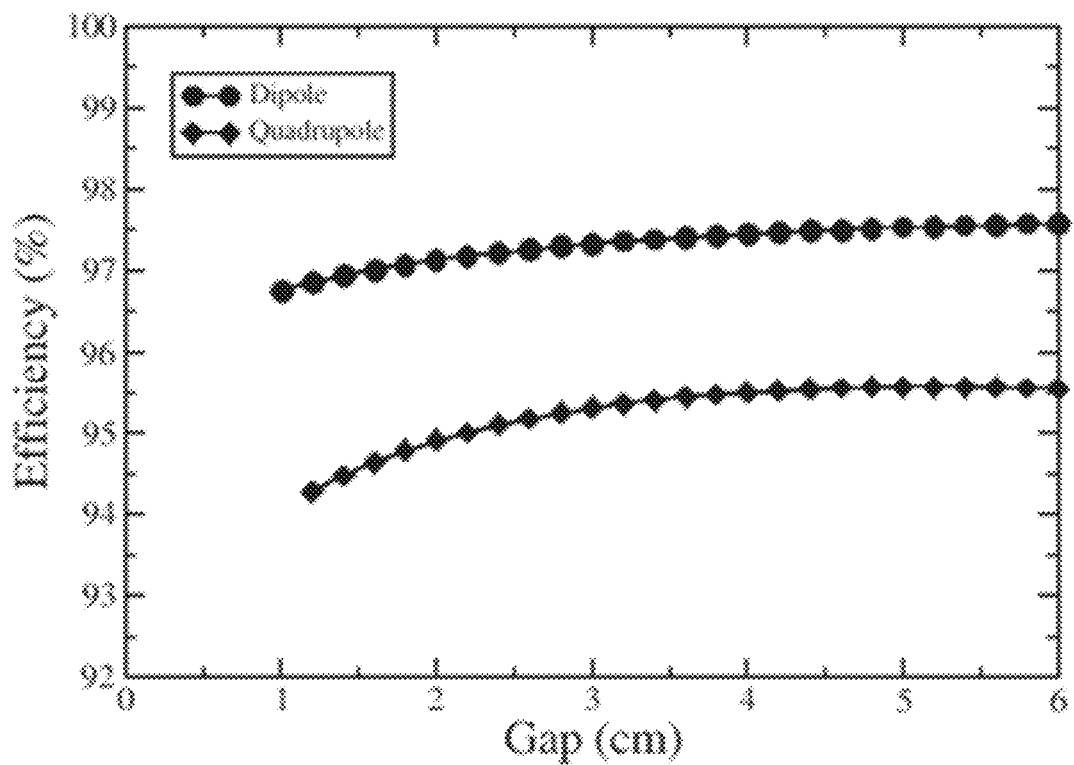
FIG. 11 is a graph of the RF efficiency of the system of FIG. 2 and the system of FIG. 8A for a first set of dimensions.

FIG. 11 is a graph of the RF efficiency of the Dipole and the Quadrupole at a resonant frequency of 13.56 MHz as a function of the gap (G) between the electrodes of the Dipole and Quadrupole at a first set of dimensions. The RF efficiency of the respective systems is defined as the efficiency of the wireless power transfer between the resonators. In the first set of dimensions, the Dipole has a length (L) of 20 cm and a width (W) of 20 cm. The Quadrupole has a length (L) of 20 cm and a width (W) of 20 cm. The distance between the transmit and receive resonators is 5 cm. As shown in FIG. 11, the Quadrupole provides a lower RF efficiency than the Dipole.

Figure 12:
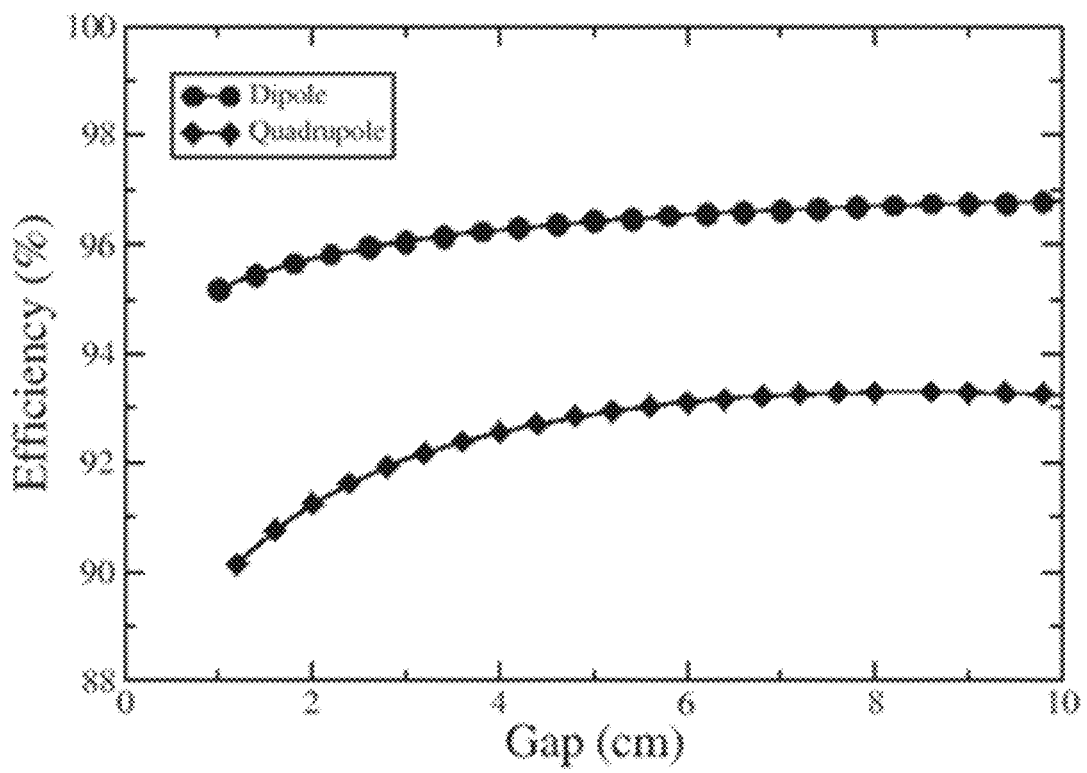
FIG. 12 is a graph of the RF efficiency of the system of FIG. 2 and the system of FIG. 8A for a second set of dimensions.

FIG. 12 is a graph of the RF efficiency of the Dipole and the Quadrupole at a resonant frequency of 13.56 MHz as a function of the gap (G) between adjacent electrodes of the Dipole and Quadrupole at a second set of dimensions. In the second set of dimensions, the Dipole has a length (L) of 30 cm and a width (W) of 30 cm. The Quadrupole has a length (L) of 30 cm and a width (W) of 30 cm. The distance between the transmit and receive resonators is 10 cm. Similar to the simulation results shown in FIG. 11, FIG. 12 shows that the Quadrupole provides a lower RF efficiency than the Dipole.

Figure 13:
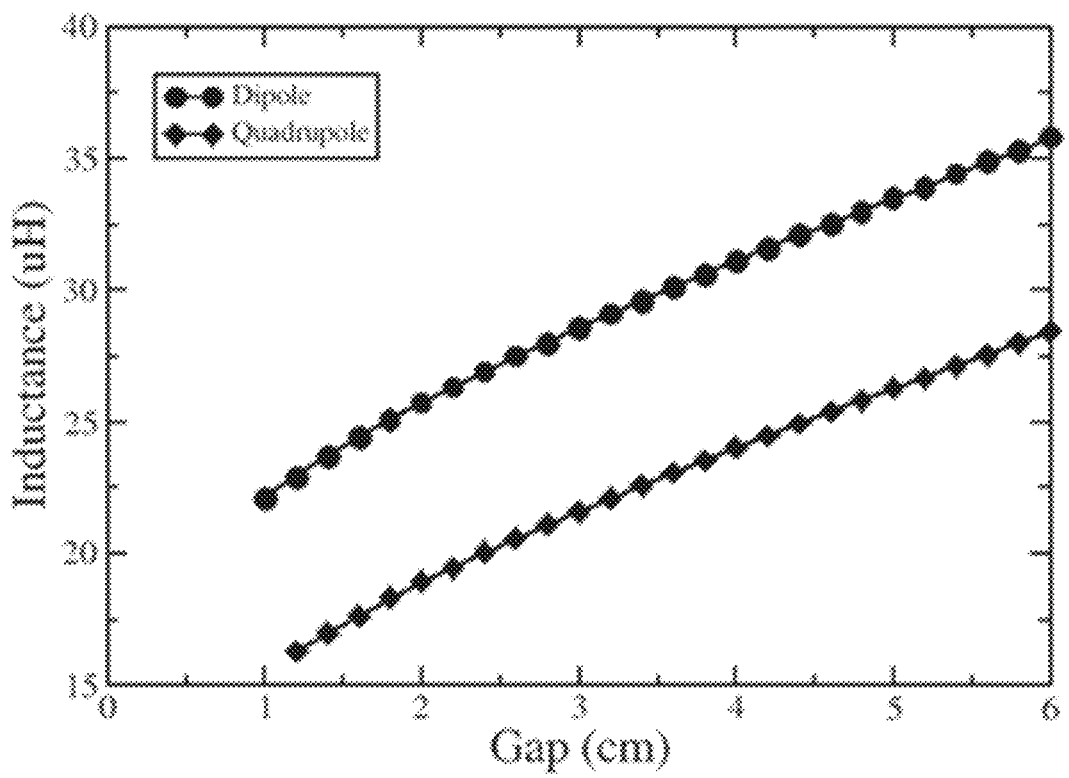
FIG. 13 is a graph of the required inductance of the inductors of the system of FIG. 2 and the inductors of the system of FIG. 8A for the first set of dimensions.

FIG. 13 is a graph of the required inductance in micro-Henry (μH) of the inductors 218 of the transmitter 210 of FIG. 2 and the inductors 818A and 818B of the transmitter 910 of FIG. 8A at a resonant frequency of 13.56 MHz as a function of the gap (G) between the electrodes of the Dipole and Quadrupole at the first set of dimensions. As shown in FIG. 13, the Quadrupole requires a lower inductance than the Dipole. One skilled in the art will appreciate that the required inductance on the receiver is the same given that the electrodes are identical.

Figure 14:
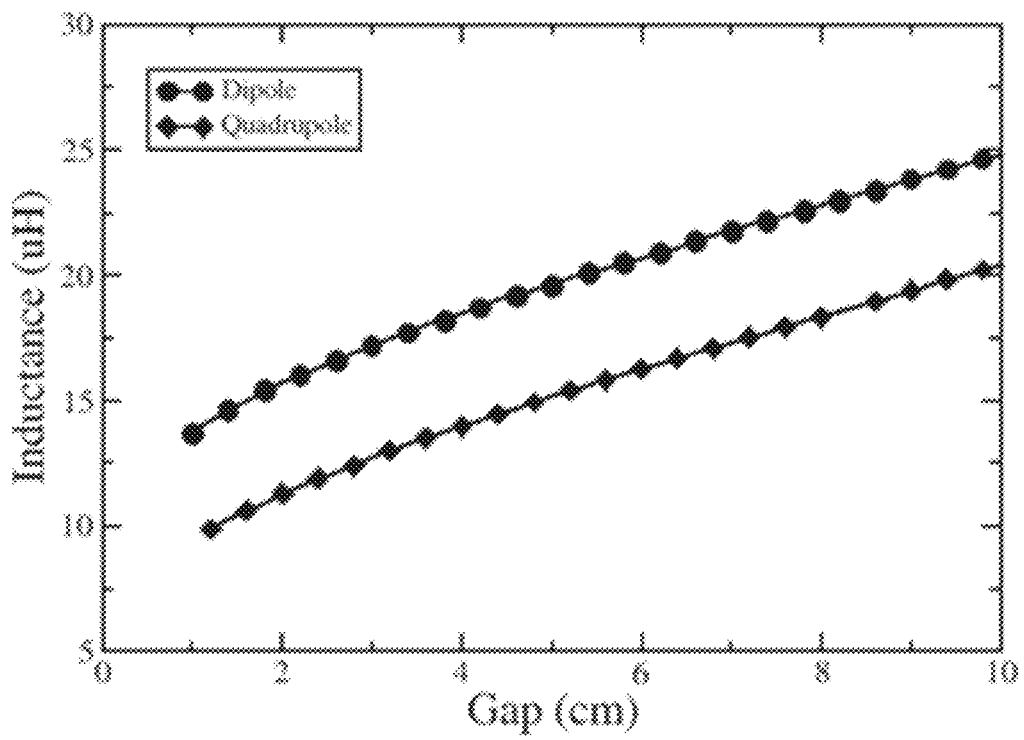
FIG. 14 is a graph of the required inductance of the inductors of the system of FIG. 2 and the inductors of the system of FIG. 8A for the second set of dimensions.

FIG. 14 is a graph of the required inductance in micro-Henry (μH) of the inductors 218 and 228 of the system 200 of FIG. 2 and the inductors 818A and 818B of the system 900 of FIG. 8A at a resonant frequency of 13.56 MHz as a function of the gap (G) between the electrodes of the Dipole and Quadrupole at the second set of dimensions. Similar to the simulation results shown in FIG. 13, FIG. 14 shows that the Quadrupole requires a lower inductance than the Dipole.

This reduction of inductance required by the system 900 utilizing the capacitive electrode assembly 700 allows for lighter, less bulky wireless power transfer systems. Reducing the required inductance reduces the loss in the inductors, which improves RF efficiency and mitigate heating issues. Thus, while the system 900 has reduced RF efficiency compared to the RF efficiency of the system 200 due to reduced coupling between the transmit and receive resonators 800 and 850, respectively, the system 900 has increased RF efficiency due to the reduced inductance required.

Figure 15:
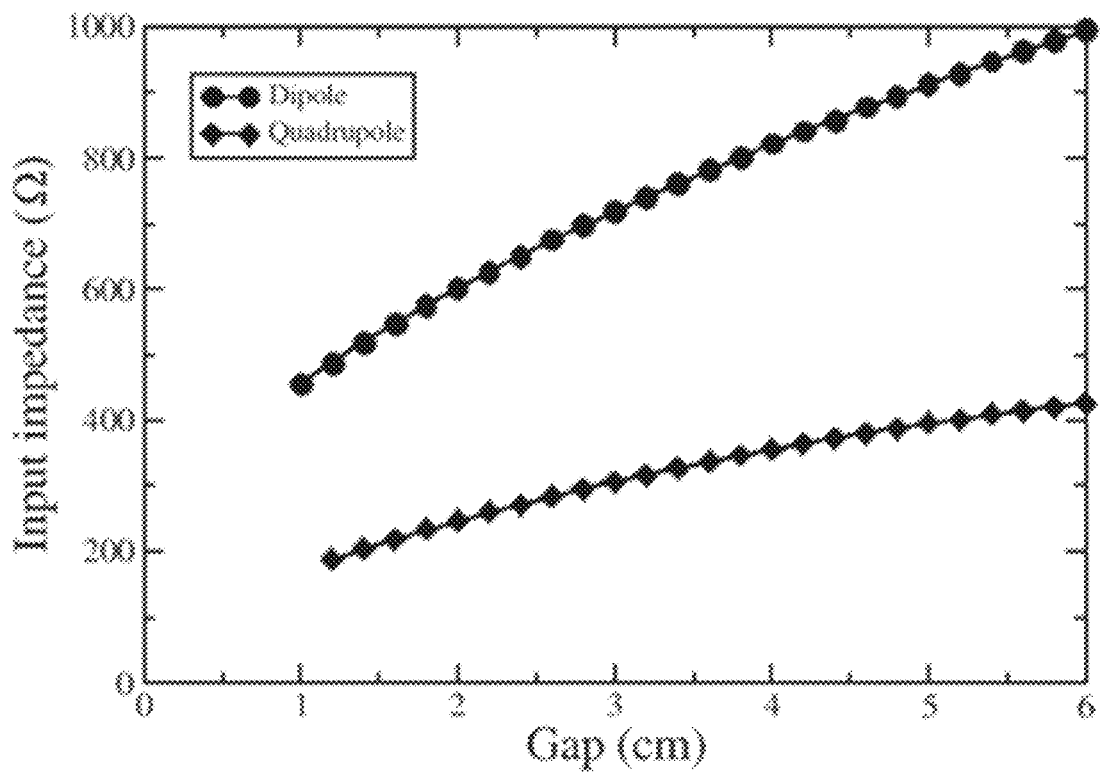
FIG. 15 is a graph of the input impedance of the system of FIG. 2 and the system of FIG. 8A for the first set of dimensions.

FIG. 15 is a graph of the input impedance in Ohms (Ω) of the Dipole and the Quadrupole at a resonant frequency of 13.56 MHz as a function of the gap (G) between the electrodes of the Dipole and Quadrupole at the first set of dimensions. As shown in FIG. 15, the Quadrupole requires a lower input impedance than the Dipole.

Figure 16:
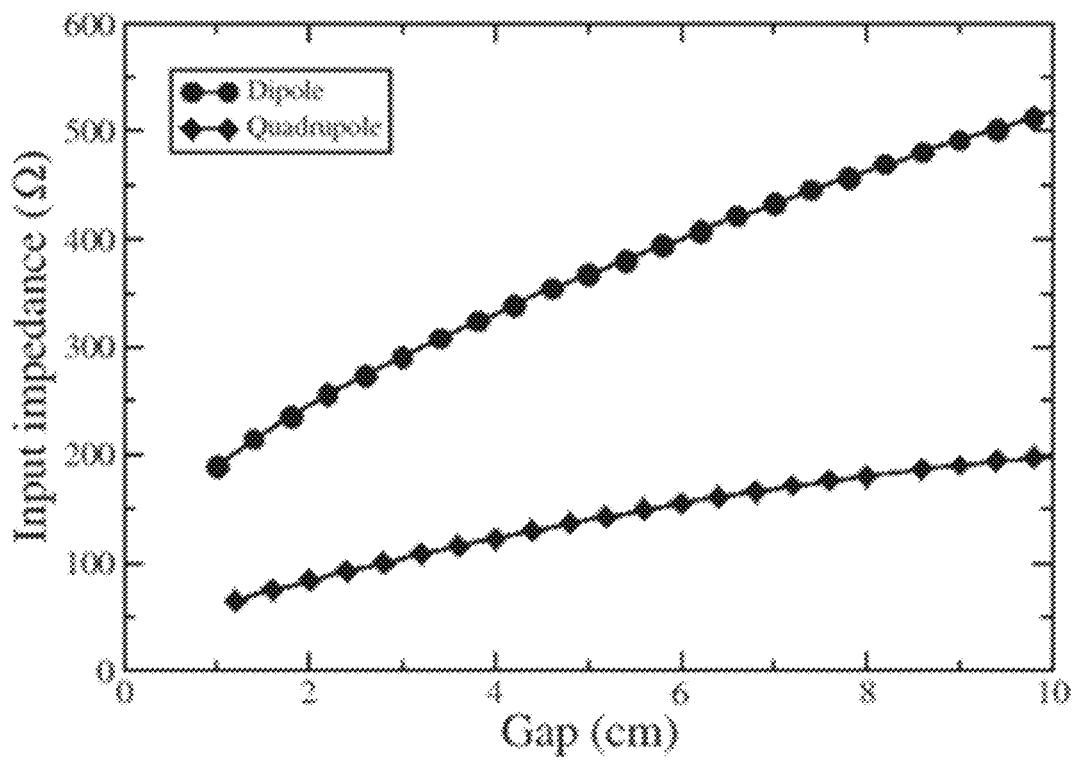
FIG. 16 is a graph of the input impedance of the system of FIG. 2 and the system of FIG. 8A for the second set of dimensions.

FIG. 16 is a graph of the input impedance in Ohms (Ω) of the Dipole and the Quadrupole at a resonant frequency of 13.56 MHz as a function of the gap (G) between the electrodes of the Dipole and Quadrupole at the second set of dimensions. Similar to the simulation results shown in FIG. 15, FIG. 16 shows that the Quadrupole requires a lower input impedance than the Dipole.

In this embodiment, the input impedance of the inverter, which forms part of the power source 912, and transforms the DC signal within the power source 912 into an AC signal output by the power source 912 is approximately 20Ω. Where the inverter employs a 3:1 winding ratio balun, the inverter can handle input impedances up to 180Ω. Input impedances over 180Ω can be controlled by a balun with a winding ratio greater than 3:1, but this will result in a greater leakage inductance and losses due to poor coupling, reducing the RF efficiency. Because the Quadrupole does not operate at a high input impedance, the Quadrupole is more reliable for short-range wireless power transfer. Short-range is defined as generally ¼ of the characteristic length of the electrodes for Quadrupole and ½ of the characteristic length of the electrodes for Dipole.

Figure 17A:
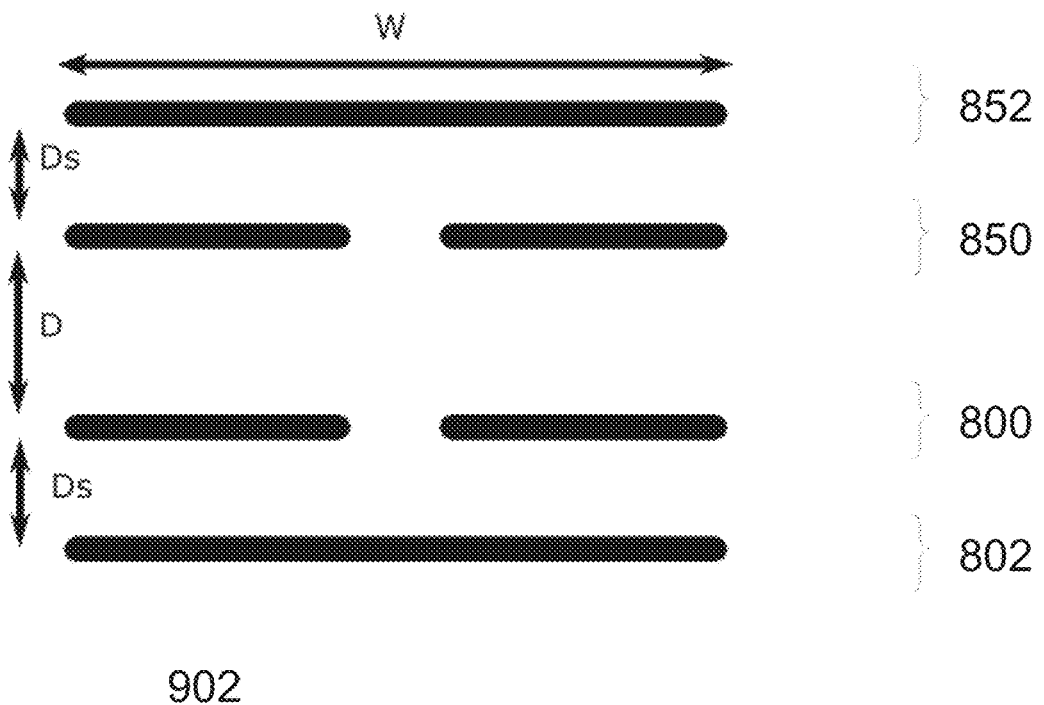
FIG. 17A is a side view of another embodiment of a partial wireless power transfer system with passive electrodes in accordance with an aspect of the disclosure.

While a particular wireless power transfer system 900 has been described, one of skill in the art will appreciate that other configurations are possible. Turning now to FIG. 17A, a partial wireless power transfer system is shown generally identified by reference numeral 902. The wireless power transfer system 902 comprises all of the elements of the previously described wireless power transfer system 900 unless otherwise stated. In this embodiment, the transmit resonator 800 of the wireless power system 902 further comprises a transmit passive electrode 802 and the receive resonator 850 of the wireless power system 902 further comprises a receive passive electrode 852. As one of skill in the art will appreciate only two of the electrodes of the transmit resonator 800, and only two of the electrodes of the receive resonator 850 are shown in FIG. 17A.

As described in U.S. patent application Ser. No. 16/138,344 filed on Sep. 21, 2018, the relevant portions of which are incorporated herein by reference, the transmit passive electrode 802 is adjacent the electrodes of the transmit resonator 800 and configured to encompass the electrodes of the transmit resonator 800 to at least partially environmental influences affecting the electrodes of the transmit resonator 800. Similarly, the receive passive electrode 852 is adjacent the electrodes of the receive resonator 850 and configured to encompass the electrodes of the receive resonator 850 to at least partially environmental influences affecting the electrodes of the receive resonator 850. In this embodiment, the plane formed by the transmit passive electrode 802 is generally parallel with the plane formed by the electrodes of the transmit resonator 800 in the x-y axis. Similarly, the plane formed by the receive passive electrode 852 is generally parallel with the plane formed by the electrodes of the receive resonator 850 in the x-y axis.

For the purposes of the subject application, a passive electrode is said to encompass an electrodes when at least one of the following occurs: (i) if the areas defined by the perimeters of the electrodes are projected onto the area of the passive electrode, the projection is entirely within the area of the passive electrode; (ii) the projected areas of the electrodes are circumscribed by the area of the passive electrode; and (iii) the area of the passive electrode is greater than the total area defined by the perimeters of the electrodes by at least the area between the electrodes.

FIG. 17A illustrates the separation distance (Dst) between the passive transmit electrode 802 and the electrodes of the transmit resonator 800, and the separation distance (Dsr) between the passive receive electrode 852 and the electrodes of the receive resonator 850. In this embodiment, Dst is equal to Dsr. The distance (D) between the electrodes of the transmit resonator 800 and the electrodes of the receive resonator 850 is also shown.

In this embodiment, the passive electrodes 802 and 852 are composed of copper. The transmit passive electrode 802 has the same or greater outer peripheral dimensions as the transmit resonator 800. The receive passive electrode 852 has the same or greater outer peripheral dimensions as the receive resonator 850. The electrodes of the resonators 800 and 850 are copper. The connectors of the resonators 800 and 850 are copper. The electrodes of the resonators 800 and 850 have a thickness of 0.07 mm. The passive electrodes 802 and 852 have a thickness of 0.07 mm. In this embodiment, the resonators 800 and 850 have a width (W) of 25 cm and a length (L) of 10 cm. The capacitive electrodes of the transmit resonator 800 are spaced from the capacitive electrodes of the receive resonator 850 by a distance (D) of 2 cm.

Simulations were performed comparing the performance of the electrode assembly 700 in the wireless power transfer system 902, and the wireless power transfer system 200 with passive electrodes. The passive electrodes added to the wireless power transfer system 200 are configured to encompass the electrodes of the respective resonators 214 and 224 as described in relation to FIG. 17A. The results of these simulations are shown in FIGS. 17B to 20. For ease of reference, simulation results for the system 200 with passive electrodes are referred to as "Dipole" and simulation results for the system 902 with passive electrodes 802 and 852 are referred to as "Quadrupole".

Figure 17B:
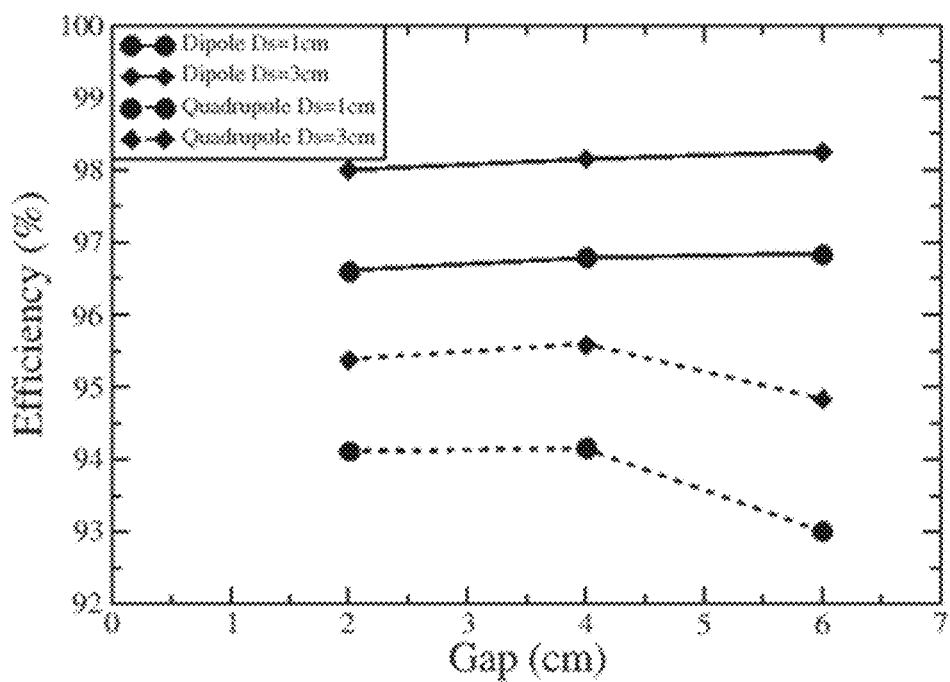
FIG. 17B is a graph of the RF efficiency of the system of FIG. 2 with passive electrodes and the system of FIG. 17A with passive electrodes.

FIG. 17B is a graph of the RF efficiency of the Dipole and the Quadrupole at a resonant frequency of 13.56 MHz as a function of the gap (G) between electrodes of a single resonator of the Dipole and Quadrupole for passive electrode separation distances (Ds) of 1 cm and 3 cm. The RF efficiency of the respective systems is defined as the efficiency of the wireless power transfer between the resonators. As shown in FIG. 17, the RF efficiency of the Quadrupole is less than the RF efficiency of the Dipole at all passive electrode distances (Ds). The RF efficiency of the Dipole is approximately 2.5% higher than the Quadrupole. The difference in efficiency is roughly constant for any separation distance (Ds) and gap (G).

Figure 18:
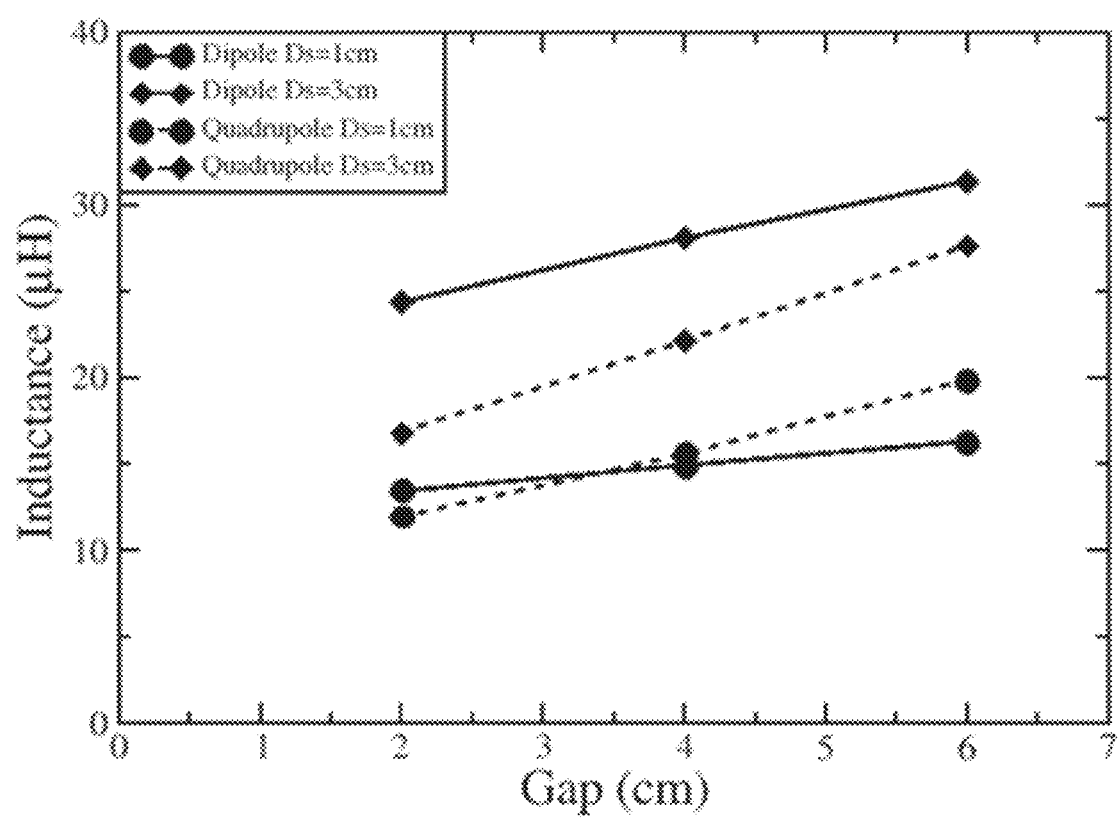
FIG. 18 is a graph of the required inductance of the system of FIG. 2 with passive electrodes and the system of FIG. 17A with passive electrodes.

FIG. 18 is a graph of the required inductance in micro-Henry (pH) of the inductors of the Dipole and the Quadrupole at a resonant frequency of 13.56 MHz as a function of the gap (G) between the electrodes of a single resonator of the Dipole and Quadrupole for passive electrode separation distances (Ds) of 1 cm and 3 cm. As shown in FIG. 18, the Quadrupole requires less inductance than the Dipole when the passive electrode separation distance (Ds) is 3 cm. However, when the passive electrode separation distance (Ds) is 1 cm, the Quadrupole requires more inductance when the gap (G) increases past approximately 3.5 cm.

Figure 19:
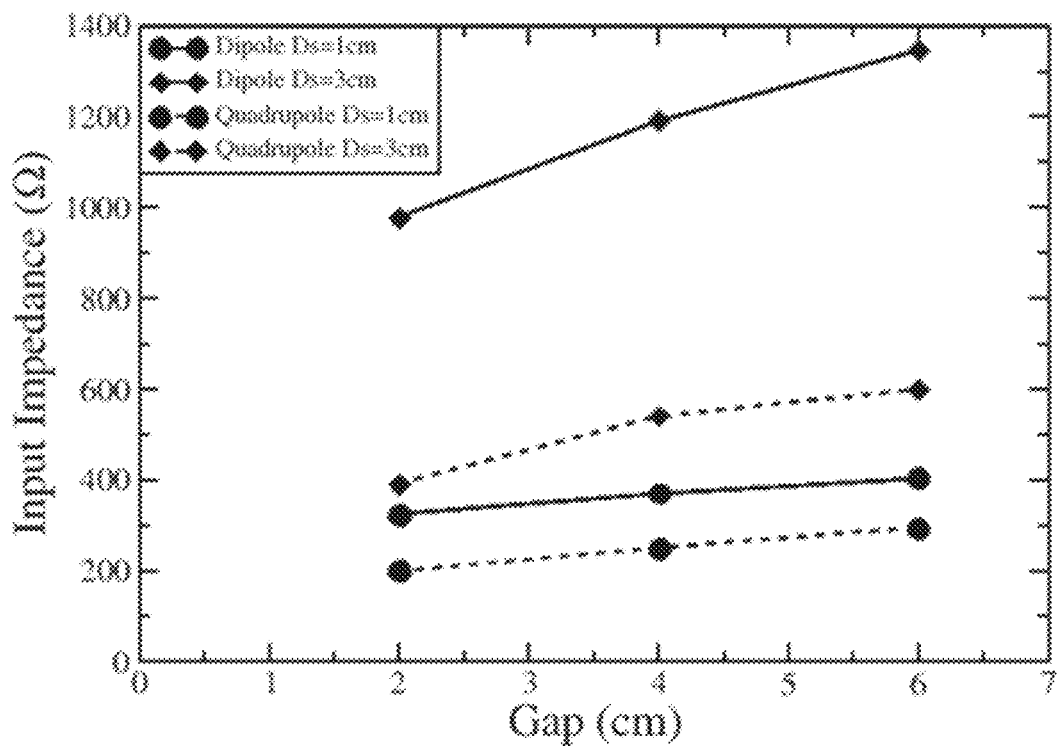
FIG. 19 is a graph of the input impedance of the system of FIG. 2 with passive electrodes and the system of FIG. 17A with passive electrodes.

FIG. 19 is a graph of the input impedance in Ohms (Ω) of the Dipole and the Quadrupole at a resonant frequency of 13.56 MHz as a function of the gap (G) between the electrodes of a single resonator of the Dipole and Quadrupole. As shown in FIG. 19, the Quadrupole has a substantially lower input impedance (greater than or approximately equal to 600Ω) than the Dipole when the passive electrode separation distance (Ds) is 3 cm. However, when the passive electrode separation distance (Ds) is 1 cm, the input impedance of the Quadrupole is only approximately 100Ω less than the Dipole input impedance.

As previously stated, the electrode assembly 700 is configured to generate an electric field (E) that contains a dipole term of negligible magnitude and higher order terms (quadrupole and octupole terms) of significantly greater magnitude to produce a localized electric field (E). Thus, the electric field (E) produced by the transmit resonator 800 of the system 900 has a lower strength at far distances (r>>L) than the transmit resonator 214 of the system 200. Simulations were performed to calculate the electric field (E) of the system 200 with the capacitive electrodes 216 and 226 with the passive electrodes (referred to as "Dipole"), and for the system 902 with the capacitive electrode assembly 700 and the passive electrodes 802 and 852 (referred to as "Quadrupole"). For a reliable comparison, both the outside dimensions of the transmit and receive resonators of the systems 200 and 902 were identical. The output power ($P_{out}$) of the systems 200 and 902 was set at 35 W. In this embodiment, the passive electrode separation distance (Ds) is 2 cm. The gap (G) between the capacitive electrodes of the Dipole and Quadrupole is 2 cm. The distance (D) between the transmitter and receiver of the Dipole and Quadrupole is 2 cm.

Figure 20:
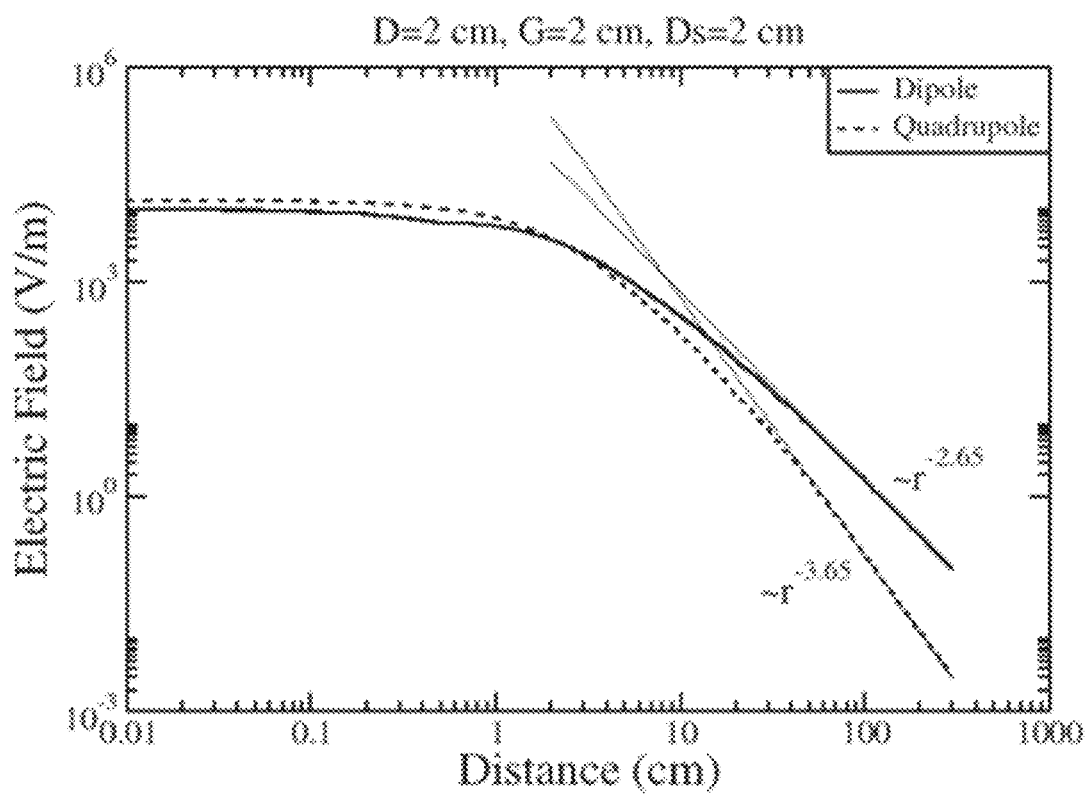
FIG. 20 is a graph of the electric field of the system of FIG. 2 with passive electrodes and the system of FIG. 17A with passive electrodes.

FIG. 20 is a graph of the electric field (E) of the Dipole and Quadrupole calculated along a 3 m line on the center plane, extending from the side edge of the transmit resonator 214 and 800. The proportionality between: the distance (r) from the transmit resonator 214 and 800 of the Dipole and Quadrupole and the electric field (E) magnitude at large distances is obtained from FIG. 20 by taking the slope of a line tangent to the curve at the farthest calculated distance (r). The Dipole is proportional to $r^{-2.65}$ whereas the Quadrupole is proportional to $r^{-3.65}$ The values do not align perfectly with the terms in Equation 3 for a dipole and quadrupole, but this is expected as the electrodes are distributed charges instead of a small collection of point charges. Despite this discrepancy, the Quadrupole clearly reduces the magnitude of the electric field (E) by a factor of $r^{-1}$ when compared to the Dipole.

Figure 21:
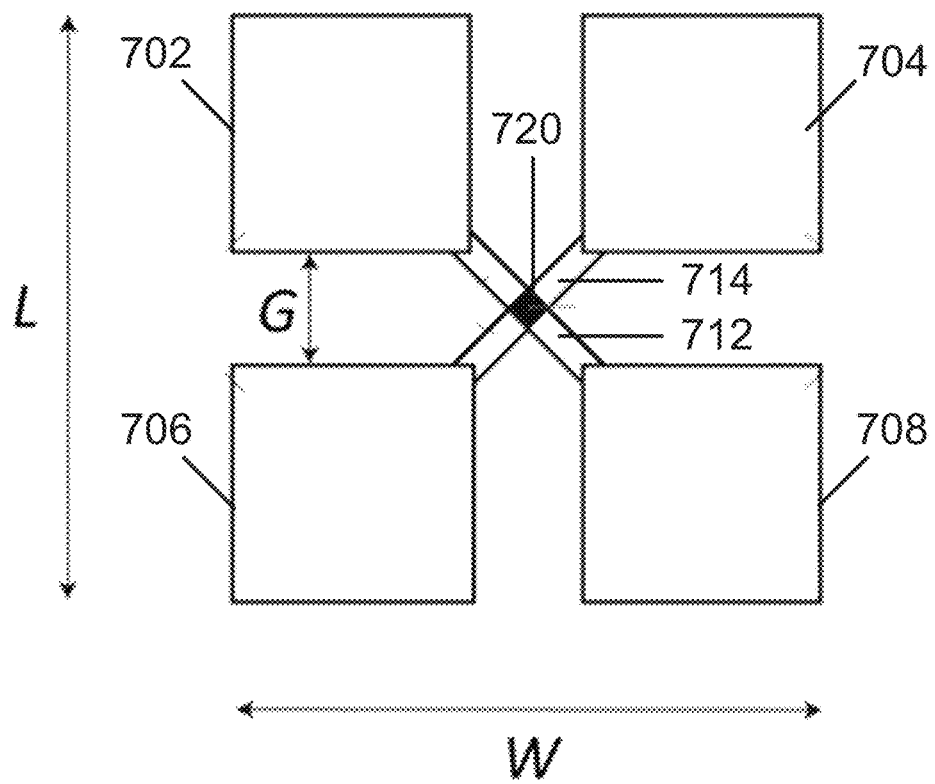
FIG. 21 is another plan view of the capacitive electrode assembly of FIG. 6B with an overlapping region highlighted.

As previously stated, the electrodes of the capacitive electrode assembly 700 are connected by connectors 712 and 714. As shown in FIG. 6B, the connectors 712 and 714 overlap. FIG. 21 shows the overlapping region of connectors 712 and 714 generally identified by reference numeral 720. The overlapping of the connectors 712 and 714 creates a non-negligible capacitance. When the capacitance electrode assembly 700 is part of a resonator (e.g. transmit resonator 800 and receive resonator 850), the capacitance of the resonator increases. As a result of this increased capacitance, the mutual coupling between transmit resonator 800 and receive resonator 850 decreases. The width of the connectors 712 and 714 may be decreased to reduce this additional capacitance; however, this reduces the current rating of the respective transmit or receive resonator 800 and 850.

Figure 22A:
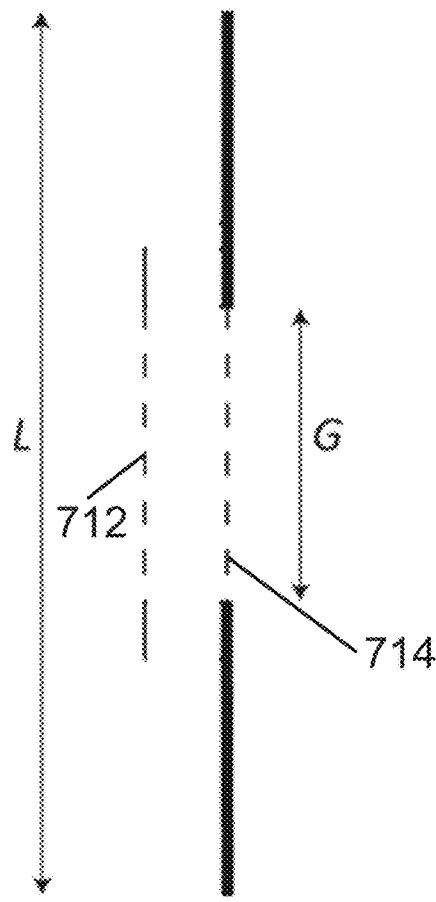
FIG. 22A is a right side view of the capacitive electrode assembly of FIG. 6B.

FIG. 22A shows a right side view of the capacitive electrode assembly 700. In this view two of the four electrodes are visible. The connectors 712 and 714 are shown in dashed lines in FIG. 22A.

Figure 22B:
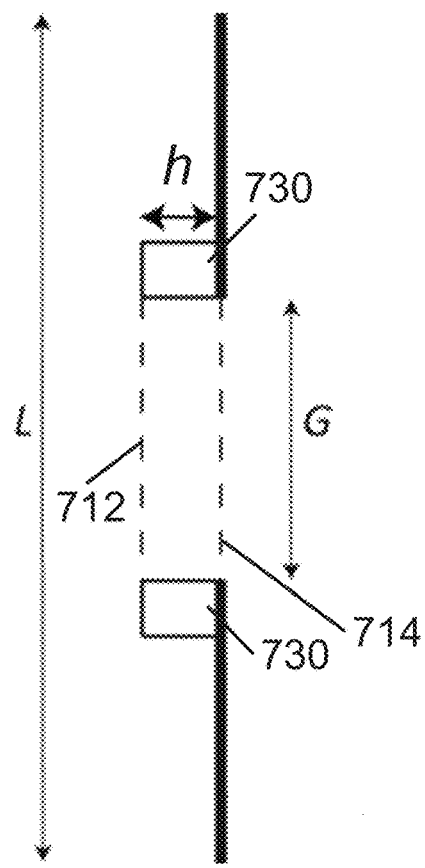
FIG. 22B is a right side view of another embodiment of the capacitive electrode assembly of FIG. 6B.

FIG. 22B shows a right side view of another embodiment of the capacitive electrode assembly. In this embodiment, the capacitive electrode assembly comprises first and second connectors that are identical to the previously described connectors 712 and 714, respectively, unless otherwise stated. In this embodiment, the connectors are separated by two or more spacers 730 of a height (h).

Figure 23:
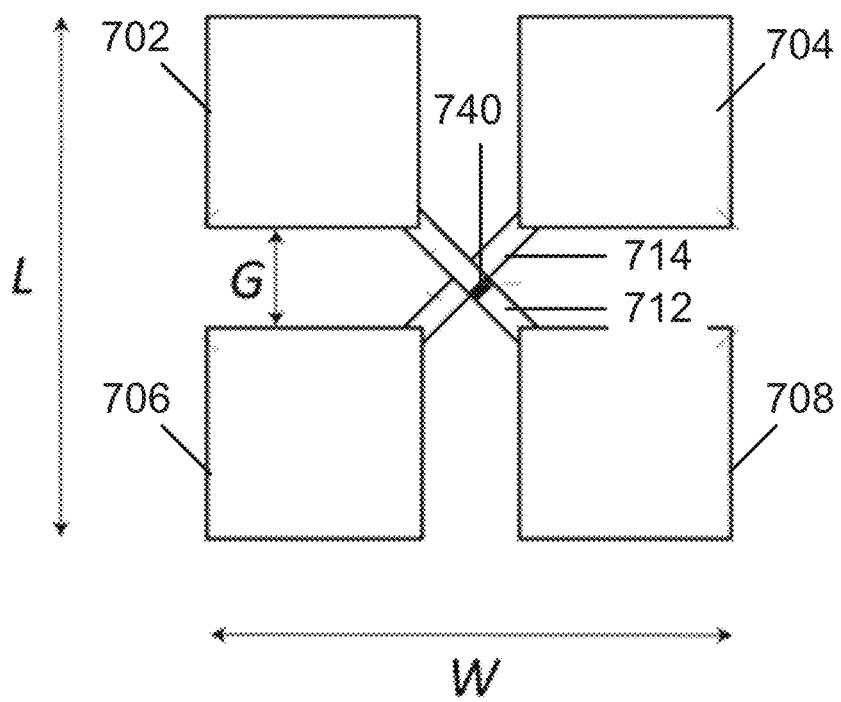
FIG. 23 is another plan view of the capacitive electrode assembly of FIG. 6B with a surface current region highlighted.

FIG. 23 shows another front view of the capacitive electrode assembly 700 of FIGS. 6A and 6B. FIG. 23 shows the surface current region generally identified by reference numeral 740 that is a width of the connector 712 that is perpendicular to current flow and indicates where surface current is calculated as will be described.

As shown in Table 1 below, changing the width of the connectors 712 and 714 affects the electric field (E) generated by the transmit resonator 800 of the system 900. Simulations were performed to determine: the average electric field (E) over the overlapping region 720, the surface current at the surface current region 740 and the inductance required to resonate the system 900 at a resonant frequency of 13.56 MHz when the width of the connectors 712 and 714 is varied. In these simulations, the width (W) and length (L) of the capacitive electrode assembly 700 is 20 cm, and the gap (G) is 6 cm. The distance between the transmit and receive resonators 800 and 850, respectively, is 5 cm. The spacing between the connectors 712 and 714 is 0.5 cm. The system 900 is configured to deliver 35 W of power. Three different widths of connectors 712 and 714 are presented, a connector width of 0.1 cm, 0.5 cm and 1.0 cm. The results of these simulations are presented in Table 1 below.

TABLE 1

| CONNECTOR WIDTH (CM) | AVERAGE ELECTRIC FIELD (MV/M) | SURFACE CURRENT (A/M) | INDUCTANCE (μH) |
|---|---|---|---|
| 0.1 | 0.16 | 0.101 | 30.8 |
| 0.5 | 0.19 | 0.125 | 28.4 |
| 1.0 | 0.19 | 0.136 | 26.2 |

As shown in Table 1, increasing the widths of the connectors 712 and 714 increases the magnitude of the electric field (E) in the overlapping region 720. However, the value of the electrical field (E) remains well below the electrical breakdown of air responsible for arching (3 MV/m) thereby reducing the risk of arcing. The surface current at the surface current region 740 increases as the width of the connectors 712 and 714 increases. However, thin connectors 712 and 714 may lead to higher resistances causing heating and potentially system 900 failures. However, increasing the width of the connectors 712 and 714 decreases the inductance required to resonate the transmit resonator 800 at a resonant frequency of 13.56 MHz. This inductance reduction likewise reduces the overall size and weight of the system 900 and reduces system losses which improves wireless transfer power efficiency.

The electric field (E) generated by the transmit resonator 800 of the system 900 may also be affected by altering the spacing between the connectors 712 and 714. Increasing the space (e.g. increasing the height (h) of the spacers 730) between the connectors 712 and 714 reduces the strength of the electric field (E). For electrodes of the assembly 700 that are printed on a PCB the distance between the connectors 712 and 714 may be limited by the thickness of the PCB.

As shown in Table 2 below, further simulations were performed to determine: the average electric field (E) over the overlapping region 720 and the inductance required to resonate the system 900 at a resonant frequency of 13.56 MHz when the spacing between connectors 712 and 714 is varied. In these simulations, the width (W) and length (L) of the capacitive electrode assembly 700 is 20 cm, and the gap (G) is 6 cm. The distance between the transmit and receive resonators 800 and 850, respectively, is 5 cm. The width of the connectors 712 and 714 is 0.5 cm. The system 900 is configured to deliver 35 W of power. Three different spacings between the connectors 712 and 714 are presented, a spacing of 0.16 cm, 0.5 cm and 1.0 cm. The results of these simulations are presented in Table 2 below.

TABLE 2

| CONNECTING CONDUCTOR SPACING (CM) | AVERAGE ELECTRIC FIELD (MV/M) | INDUCTANCE (µH) |
|---|---|---|
| 0.16 | 0.620 | 27.3 |
| 0.5 | 0.180 | 28.4 |
| 1.0 | 0.085 | 28.9 |

Table 2 presents that the values of the average electric field (E) are reduced by increasing the spacing between the connectors 712 and 714. As presented, this method of reducing additional capacitance increases the inductance required for resonance. When the two connectors 712 and 714 are very close (such as at a distance of 0.16 cm), the value of the electric field (E) is high and there is an increased risk of arcing; however, the value of the electric field (E) is still low for a wireless power transfer system transferring 35 W of power. Furthermore, when the two connectors 712 and 714 are very close, the capacitance of the transmit resonator 800 is increased which leads to a reduction in the inductance required for resonance at the desired operating frequency. As the capacitance of the transmit resonator 800 increases the coupling between the transmit and receive resonators 800 and 850, respectively, will decrease, which can prevent efficient wireless power transfer.

The electric field (E) strength between the connectors 712 and 714 depends upon the output power ($P_{out}$) of the system 900. Table 3 presents the average electric field (E) value for various output powers calculated at the overlapping region 720. In this embodiment, the capacitive electrode assembly 700 has a width (W) and a length (L) of 20 cm. The assembly 700 has a gap (G) of 6 cm. The distance between the transmit and receive resonators 800 and 850, respectively, is 5 cm. The width of the connectors 712 and 714 is 0.5 cm. The spacing between the connectors 712 and 714 is 0.5 cm. The output power ($P_{out}$) is the power received by the receive resonator 850 and is calculated as the input power ($P_{in}$) to the transmit resonator 800 multiplied by the RF efficiency (η), where $P_{out}=P_{in}*η$. For illustrative purposes, the RF efficiency (η) is set to 95%.

TABLE 3

| OUTPUT POWER (W) | AVERAGE ELECTRIC FIELD (MV/M) |
|---|---|
| 20 | 0.14 |
| 40 | 0.20 |
| 60 | 0.24 |
| 80 | 0.28 |
| 100 | 0.31 |

Figure 24:
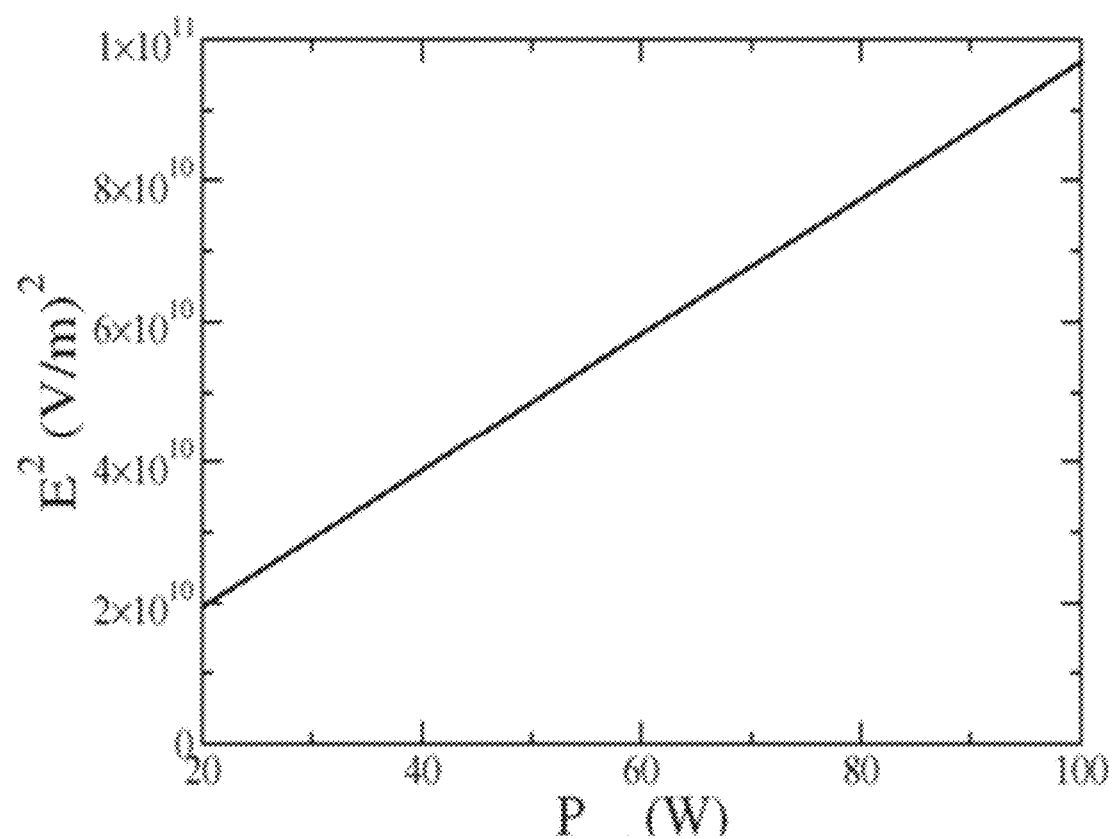
FIG. 24 is a graph of the square electric field value of Table 3 versus the output power of the system of FIG. 8A.

As shown in Table 3, the output power scales linearly with the electric field (E) squared. FIG. 24 is a graph of the Table 3 plotting the square value of the electric field (E) as a function of the output power ($P_{out}$). The linear relationship shown in FIG. 24 is expected since power is proportional to the electric field squared ($E^2$).

The capacitance between the connectors 712 and 714 is also affected by the dielectric material filling the space between the connectors 712 and 714. The presence of a dielectric in this space increases the capacitance and can mitigate the risk of arcing as dielectric have a higher electrical breakdown voltage. The dielectric may be any dielectric, such as, but not limited to, a PCB material.

As previously stated, the electrode assembly 700 is configured to generate an electric field (E) that contains a dipole term of negligible magnitude and higher order terms (quadrupole and octupole terms) of significantly greater magnitude to produce a localized electric field (E). Thus, the electric field (E) produced by the transmit resonator 800 of the system 900 generates an electric field (E) with a lower strength at far distances (r>>L) than the transmit resonator 214 of the system 200. Simulations were performed to calculate the electric field (E) of the system 200 with the capacitive electrodes 216 and 226 (referred to as "Dipole"), and for the system 900 with the capacitive electrode assembly 700 (referred to as "Quadrupole"). For a reliable comparison, the dimensions of the transmit and receive resonators of the systems 200 and 900 were selected such that the systems 200 and 900 have an RF efficiency of approximately 95% over a 5 cm power transmission distance, the inductance of the inductors of the systems 200 and 900 was fixed to approximately 27 µH, and the input impedance of the systems 200 and 900 was fixed to approximately 400Ω. The output power ($P_{out}$) of the systems 200 and 900 was set at 35 W.

Figure 25:
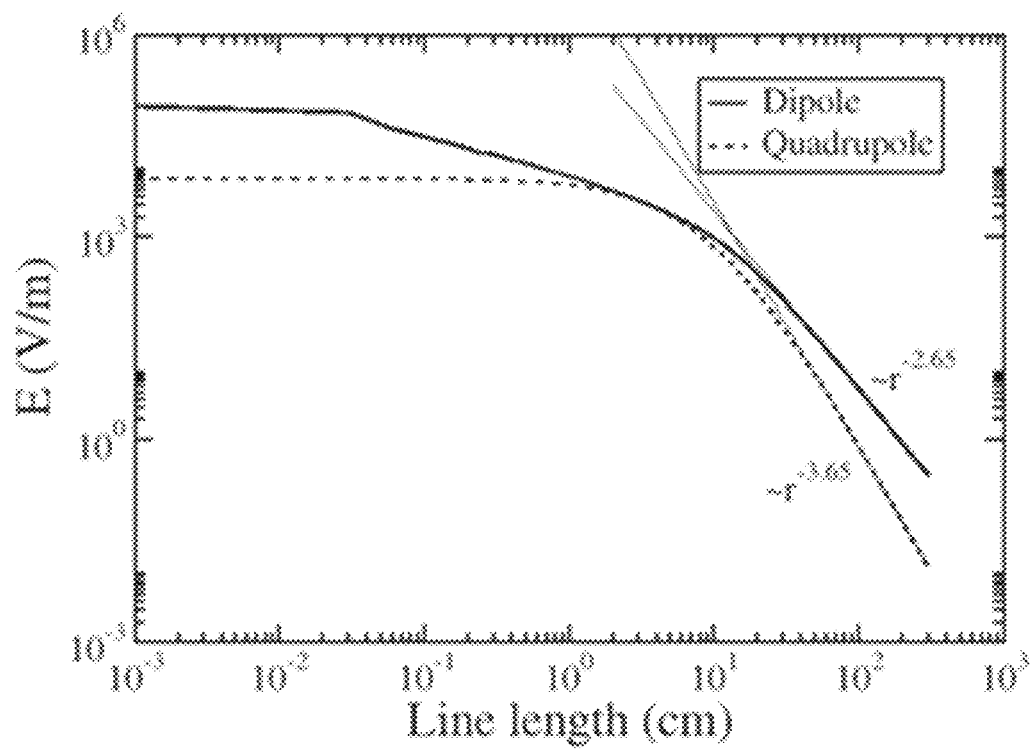
FIG. 25 is a graph of the electric field for the system of FIG. 2 and the system of FIG. 8A along a first line.

FIG. 25 is a graph of the electric field (E) of the Dipole and Quadrupole calculated along a 3 m line on the transmitter plane, extending from the side edge of the transmit resonator 214 and 800. As shown in FIG. 25, the magnitude of the electric field (E) calculated on the transmitter plane for the Dipole is higher than the magnitude of the electric field (E) for the Quadrupole at all distances. Therefore, the Quadrupole provides a wireless power transfer system with reduced electric field strength near the system 900, improving system safety.

Figure 26:
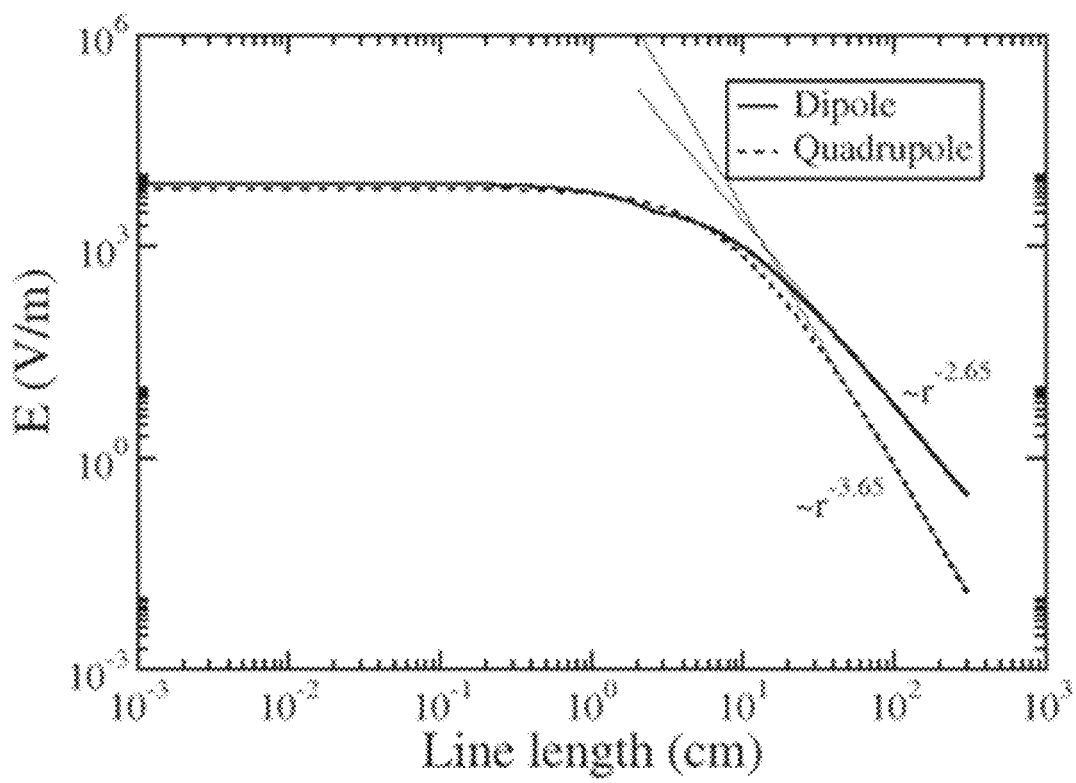
FIG. 26 is a graph of the electric field for the system of FIG. 2 and the system of FIG. 8A along a second line.

FIG. 26 is a graph of the electric field (E) of the Dipole and Quadrupole calculated along a 3 m line on the center plane between the transmitter and receiver, extending from the side edge of the transmit resonator 214 and 800. The proportionality between: the distance (r) from the transmit resonator 214 and 800 of the Dipole and Quadrupole and the electric field (E) magnitude at large distances is obtained from FIGS. 25 and 26 by taking the slope of a line tangent to the curve at the farthest calculated distance (r). The Dipole is proportional to $r^{-2.65}$ whereas the Quadrupole is proportional to $r^{-3.65}$ The values do not align perfectly with the terms in Equation 3 for a dipole and quadrupole, but this is expected as the electrodes are distributed charges instead of a small collection of point charges.

Despite this discrepancy, the Quadrupole clearly reduces the magnitude of the electric field (E) by a factor of $r^{-1}$ when compared to the Dipole. The Quadrupole is a competitive resonator design for resonant electric field wireless power transfer since the Quadrupole provides localized electric field (E) at both longer and shorter distances such that the risk of EMI is reduced.

Figure 27:
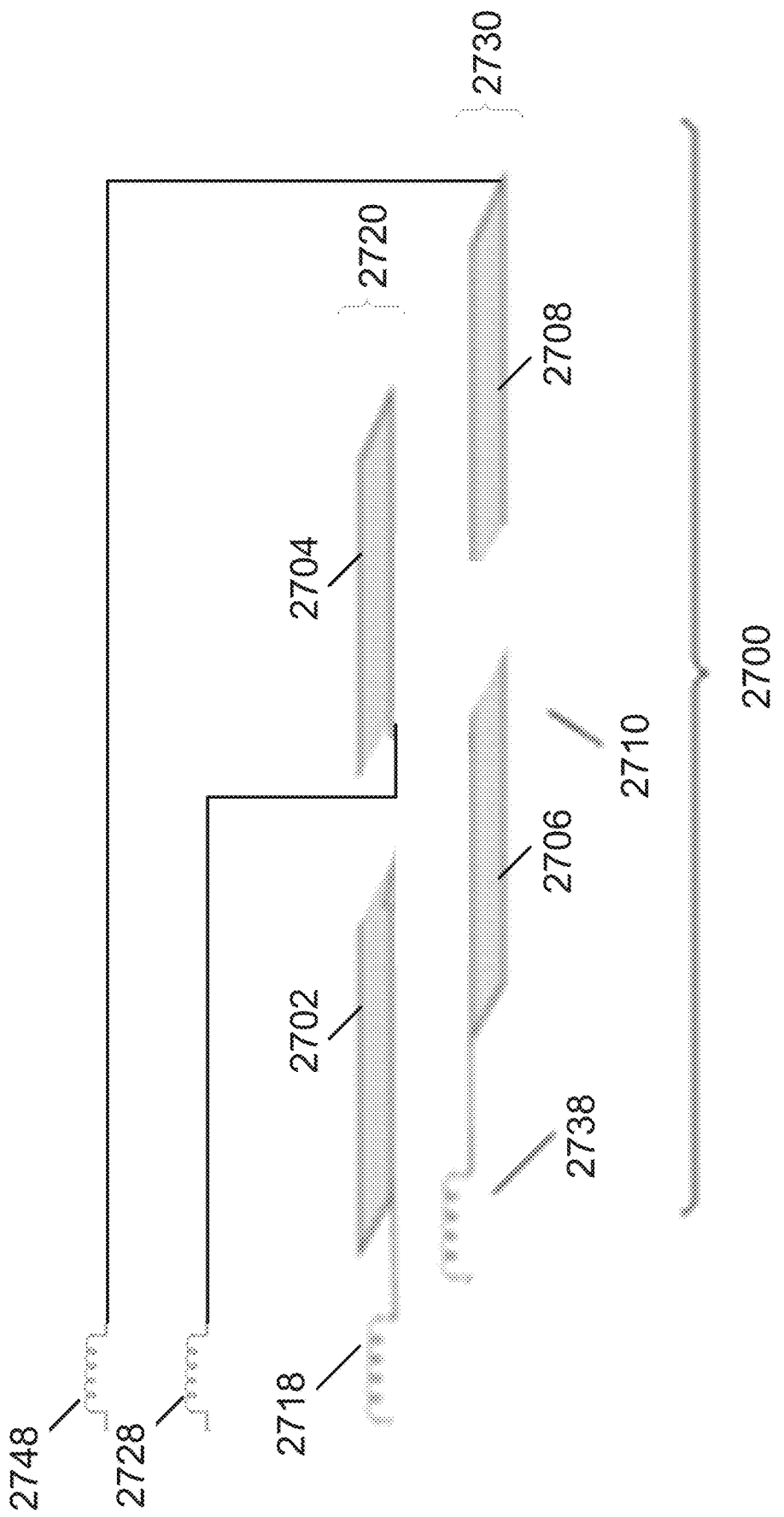
FIG. 27 is a schematic layout of another embodiment of the transmit resonator of FIG. 7.

While a particular capacitive electrode assembly 700 has been described, one of skill in the art will appreciate that other configurations are possible. FIG. 27 shows another embodiment of the transmit resonator generally identified by reference numeral 2700. The transmit resonator 2700 is configured to generate an electric field (E) having a dipole term, the term proportional to the inverse of the cube of the distance (r), of negligible magnitude (near or at zero) and higher order terms (e.g. quadrupole and octupole terms) of significantly greater magnitude to produce a localized electric field (E).

The transmit resonator 2700 comprises a capacitive electrode assembly 2710 electrically connected to a first inductor 2718 at a first terminal, electrically connected to a second inductor 2728 at a second terminal, electrically connected to a third inductor 2738 at a third terminal and electrically connected to a fourth inductor 2748 at a fourth terminal.

The capacitive electrode assembly 2710 comprises four spaced apart co-planar plate electrodes. In this embodiment, the assembly 2710 has a square perimeter at the periphery of the electrodes. The electrodes of the assembly 2710 form a square at their peripheries. The electrodes are co-planar in the x-y plane.

In this embodiment, the four electrodes are all generally square plate electrodes. The electrodes have approximately identical dimensions. The four electrodes comprise a first electrode 2702 in the upper left corner of the square formed by the electrodes, a second electrode 2704 in the upper right corner, a third electrode 2706 in the lower left corner and a fourth electrode 2708 in the lower right corner. The electrodes 2702, 2704, 2706 and 2708 have four fold mirror and rotational symmetries. In this embodiment, the electrodes lie on the x-y plane, the two mirror planes are the x-z and y-z planes, and the four fold rotational symmetry is about the z-axis.

Diagonal electrodes carry like charges. Adjacent electrodes hold opposite charges. The sign of the charge will flip twice per cycle of a power signal (i.e. 27.12 million times a second for a 13.56 MHz power signal) as will be described. Specifically, the first electrode 2702 and the fourth electrode 2708 hold positive charges when the second electrode 2704 and the third electrode 2706 hold negative charges. When the sign of the charge flips, the first electrode 2702 and the fourth electrode 2708 hold negative charges when the second electrode 2704 and the third electrode 2706 hold positive charges.

The first electrode 2702 is electrically connected to the first inductor 2718. The first electrode 2702 is directly connected to the first inductor 2718. The second electrode 2704 is electrically connected to the second inductor 2728. The second electrode 2704 is directly connected to the second inductor 2728. The third electrode 2706 is electrically connected to the third inductor 2738. The third electrode 2706 is directly connected to the third inductor 2738. The fourth electrode 2708 is electrically connected to the fourth inductor 2748. The fourth electrode 2708 is directly connected to the fourth inductor 2748.

As previously stated, the charge of the first electrode 2702 and fourth electrode 2708 is positive when the charge of the second electrode 2704 and third electrode 2706 is negative. Similarly, the charge of the first electrode 2702 and fourth electrode 2708 is negative when the charge of the second electrode 2704 and third electrode 2706 is positive. The first electrode 2702 and the second electrode 2704 which is oppositely charged to the charge of the first electrode 2702, form a first dipole 2720. The third electrode 2706 and the fourth electrode 2708 which is oppositely charged to the charge of the third electrode 2706, form a second dipole 2730.

The first dipole 2720 is configured to generate an electric field (E) having a dipole term in a first direction. The second dipole 2730 is configured to generate an electric field (E) having a dipole term in a second direction. The dipole terms of the electric fields (E) generated by the dipoles 2720 and 2730 are equal in magnitude as the electrodes 2702, 2704, 2706 and 2708 have identical (or near identical) dimensions. The first and second directions are opposite in the x-axis as the charge distribution of the dipoles 2720 and 2730 is opposed. Thus, the dipole terms of the electric fields (E) generated by the dipoles 2720 and 2730 are equal in magnitude and opposite in direction resulting in a net zero dipole term of the net electric field (E) generated by the dipoles 2720 and 2730.

The first electrode 2702 and the third electrode 2706 which is oppositely charged to the charge of the first electrode 2702, form a third dipole. The second electrode 2704 and the fourth electrode 2708 which is oppositely charged to the charge of the second electrode 2704, form a fourth dipole. The dipole moments of the third and fourth dipoles are equal in magnitude and antiparallel along the y-axis.

When the transmit resonator 2700 is incorporating into a transmitter, each terminal of the transmit resonator 2700 is electrically connected to a terminal of a differential RF power source. Specifically, the first electrode 2702 is electrically connected to a first terminal of the differential RF power source via the first inductor 2718. The second electrode 2704 is electrically connected to a second terminal of the differential RF power source via the second inductor 2728. The third electrode 2706 is electrically connected to the second terminal of the differential RF power source via the third inductor 2738. The fourth electrode 2708 is electrically connected to the first terminal of the differential RF power source via the fourth inductor 2748.

Figure 28:
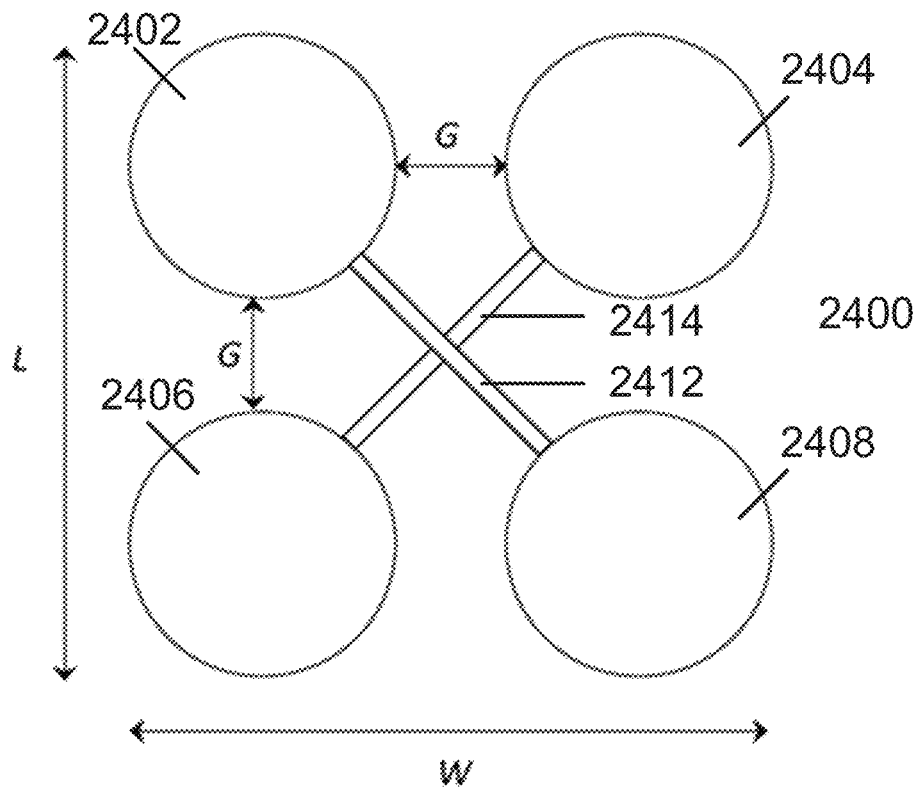
FIG. 28 is a plan view of another embodiment of the capacitive electrode assembly of FIG. 6B.

While a particular capacitive electrode assembly 700 has been described, one of skill in the art will appreciate that other configurations are possible. FIG. 28 shows another embodiment of the capacitive electrode assembly generally identified by reference numeral 2400.

The capacitive electrode assembly 2400 may form part of a resonator that is configured to generate or couple with an electric field (E) having a dipole term, the term proportional to the inverse of the cube of the distance (r), of negligible magnitude (near or at zero) and higher order terms (e.g. quadrupole and octupole terms) of significantly greater magnitude as previously described. The capacitive electrodes assembly 2400 is identical to the capacitive electrode assembly 700 already described unless otherwise stated. The electrodes of the assembly 2400 are all circular plate electrodes. The electrodes have approximately identical dimensions. The electrodes are co-planar in the x-y plane.

The four electrodes of the assembly 2400 comprise a first electrode 2402, second electrode 2404, third electrode 2406 and fourth electrode 2408. The capacitive electrode assembly 2400 has a width (W) and a length (L). The electrodes of the assembly 2400 are separated by a gap (G). The assembly 2400 further comprises connectors 2412 and 2414 that interconnect the electrodes. A first connector 2412 connects the first electrode 2402 and the fourth electrode 2408. A second connector 2414 connects the second electrode 2404 and the third electrode 2406. The connectors 2412 and 2414 are conductors. The electrodes and connectors of the assembly 2400 are charged in the same manner as the previously described assembly 700.

Figure 29:
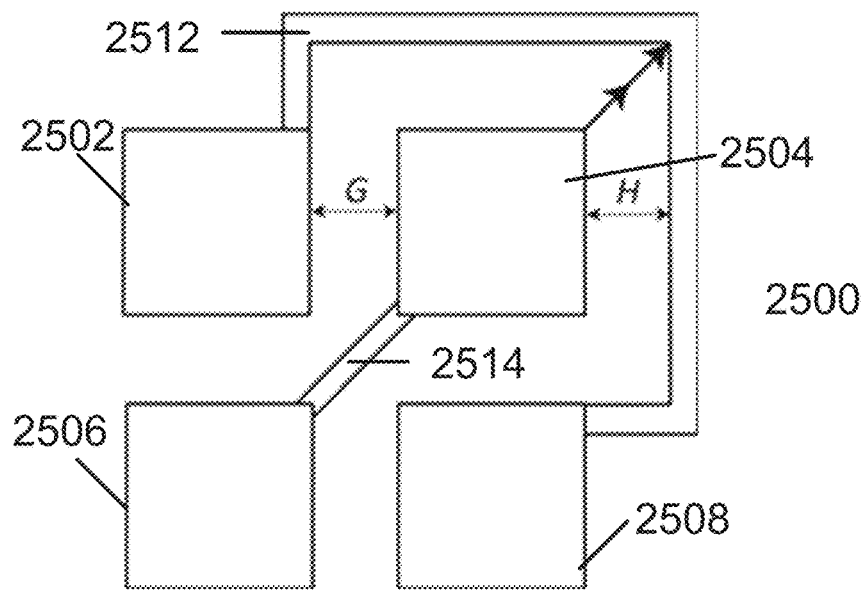
FIG. 29 is a plan view of another embodiment of the capacitive electrode assembly of FIG. 6B.

While a particular capacitive electrode assembly 700 has been described, one of skill in the art will appreciate that other configurations are possible. FIG. 29 shows another embodiment of the capacitive electrode assembly generally identified by reference numeral 2500.

The capacitive electrode assembly 2500 may form part of a resonator that is configured to generate or couple with an electric field (E) having a dipole term, the term proportional to the inverse of the cube of the distance (r), of negligible magnitude (near or at zero) and higher order terms (e.g. quadrupole and octupole terms) of significantly greater magnitude as previously described. The capacitive electrodes assembly 2500 is identical to the capacitive electrode assembly 700 already described unless otherwise stated. The electrodes of the assembly 2500 are all square plate electrodes. The electrodes have approximately identical dimensions. The electrodes are co-planar in the x-y plane.

The four electrodes of the assembly 2500 comprise a first electrode 2502, second electrode 2504, third electrode 2506 and fourth electrode 2508. The capacitive electrode assembly 2500 has a width (W) and a length (L). The electrodes of the assembly 2500 are separated by a gap (G). The assembly 2500 further comprises connectors 2512 and 2514 that interconnect the electrodes. A first connector 2512 connects the first electrode 2502 and the fourth electrode 2508. The first connector 2512 extends along the periphery of the assembly 2500 between the first electrode 2502 and the fourth electrode 2508. The first connector 2512 extends away from the outer edges of the first and second electrodes 2502 and 2504 at a distance (H). A second connector 2514 connects the second electrode 2504 and the third electrode 2506. The second connector 2514 extends diagonally between the second electrode 2504 and the third electrode 2506. The connectors 2512 and 2514 are conductors. In contrast with the connectors 712 and 714 of the assembly 700, the connectors 2512 and 2514 are non-overlapping. The electrodes and connectors of the assembly 2500 are charged in the same manner as the previously described assembly 700.

Simulations were preformed comparing a wireless power system 900 comprising the capacitive electrode assembly 700 and a wireless power system 900 comprising the capacitive electrode assembly 2500. The length (L) and width (W) of both assemblies 700 and 2500 is 20 cm. The width of the connectors in both assemblies 700 and 2500 is 0.5 cm. The gap (G) between capacitive electrodes is 6 cm. Power is transferred over a distance (D) of 5 cm.

In this embodiment, the capacitive electrode assembly 700 comprises spacers 730. The height (h) of the spacers 730 is varied and the resulting RF efficiency, required system inductance and input impedance of a wireless power transfer system 900 comprising the capacitive electrode assembly 700 is determined and presented in Table 4 below. The distance (H) of the first connector 2512 of the capacitive electrode assembly 2500 is varied and the resulting RF efficiency, required system inductance and input impedance of a wireless power transfer system 900 comprising the capacitive electrode assembly 2500 is determined and presented in Table 4 below.

TABLE 4

| CONNECTING CONDUCTOR SPACING (CM) | RF EFFICIENCY (%) | INDUCTANCE (µH) | INPUT IMPEDANCE (Ω) |
|---|---|---|---|
| Capacitive Electrode Assembly 700 | | | |
| 0.16 | 95.4 | 27.3 | 395 |
| 5.0 | 95.5 | 28.5 | 426 |
| 10.0 | 95.6 | 28.9 | 439 |
| 15.0 | 95.8 | 29.1 | 444 |
| 20.0 | 95.9 | 29.1 | 446 |
| Capacitive Electrode Assembly 2500 | | | |
| 0.16 | 93.2 | 19.1 | 187 |
| 5.0 | 94.1 | 21.6 | 241 |
| 10.0 | 94.6 | 23.0 | 282 |
| 15.0 | 94.9 | 23.7 | 309 |
| 20.0 | 95.1 | 24.2 | 330 |

As shown in Table 4, a wireless power transfer system 900 comprising the capacitive electrode assembly 2500 has a lower RF efficiency than a wireless power transfer system 900 comprising the capacitive electrode assembly 700. However, wireless power transfer system 900 comprising the capacitive electrode assembly 2500 has a lower required inductance and input impedance than a wireless power transfer system 900 comprising the capacitive electrode assembly 700.

One of skill in the art will appreciate that the capacitive electrode assemblies 2400 and 2500 may form part of the transmit and receive resonators 800 and 850 previously described which may form part of the wireless power transfer system 900.

Figure 30:
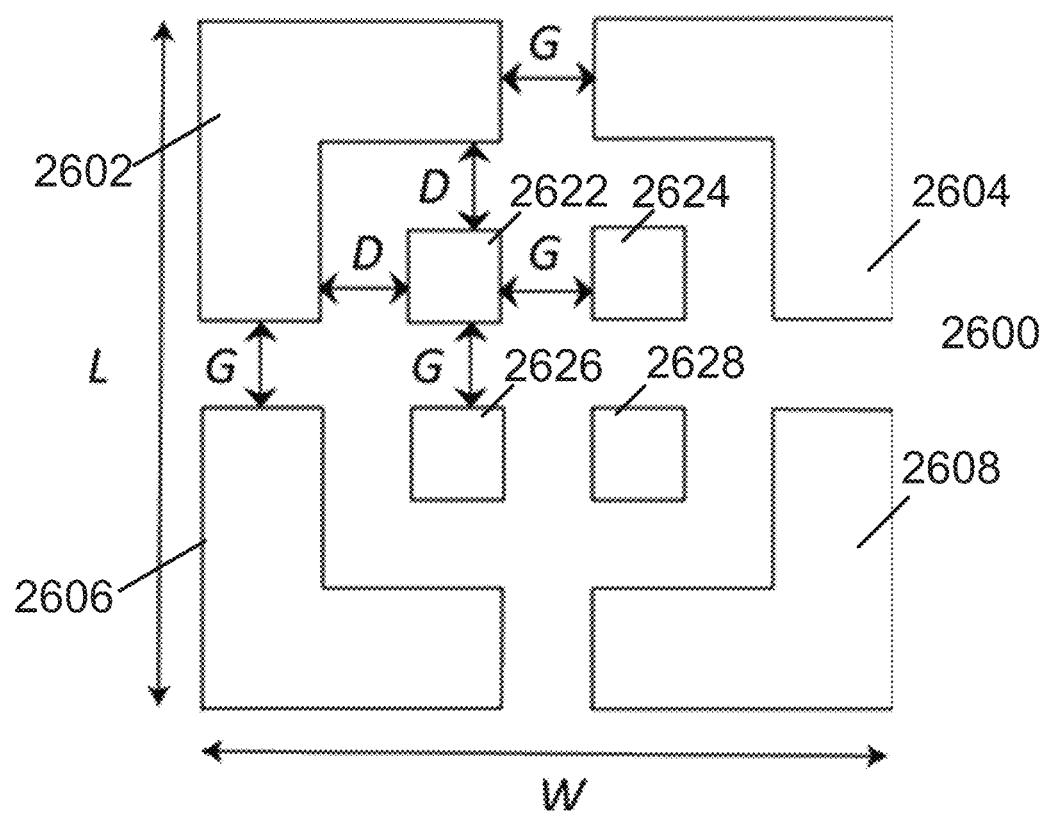
FIG. 30 is a plan view of another embodiment of a portion of the wireless power transfer system of FIG. 8A.

While a particular wireless power transfer system 900 has been described, one of skill in the art will appreciate that other configurations are possible. FIG. 30 shows a portion of another embodiment of a wireless power transfer system generally identified by reference numeral 2600.

The wireless power transfer system 2600 comprises a transmitter comprising a power source (not shown) electrically connected to a transmit resonator that comprises four transmit electrodes and connectors (not shown). The system 2600 further comprises a load (not shown) electrically connected to a receive resonator that comprises four receive electrodes and connectors (not shown). The transmit resonator further comprises at least one inductor (not shown) electrically connected to the four transmit electrodes. The receive resonator further comprises at least one inductor (not show) electrically connected to the four receive electrodes.

The transmit electrodes are planar plate electrodes. The transmit electrodes are generally L-shaped. The transmit electrodes have identical dimensions. The transmit electrodes are co-planar in the x-y plane. The transmit electrodes are oriented to form a generally square shape at the outer periphery of the transmit electrodes. The transmit electrodes are oriented to enclose a generally square enclosure at the inner periphery of the transmit electrodes. The inner periphery of the transmit electrodes surrounds the receive electrodes. The transmit electrodes are separated by a gap (G). The transmit electrodes comprises a first transmit electrode 2602, a second transmit electrode 2604, a third transmit electrode 2606 and a fourth transmit electrode 2608. The first and fourth transmit electrodes 2602 and 2608, respectively, are positively charged while the second and third transmit electrodes 2604 and 2606, respectively, are negatively charged.

The receive electrodes are planar plate electrodes. The receive electrodes are square electrodes. The receive electrodes are co-planar in the x-y plane. The transmit and receive electrodes are co-planar in the x-y plane. The receive electrodes form a square at their peripheries. The receive electrodes are spaced from the transmit electrodes by a distance (D). The receive electrodes are separated by the gap (G). The receive electrodes comprises a first receive electrode 2622, a second receive electrode 2624, a third receive electrode 2626 and a fourth receive electrode 2628. The first and fourth receive electrodes 2622 and 2628, respectively, are negatively charged while the second and third receive electrodes 2624 and 2626, respectively, are positively charged.

The transmit resonator is configured to generate an electric field (E) having a dipole term, the term proportional to the inverse of the cube of the distance (r), of negligible magnitude (near or at zero) and higher order terms (e.g. quadrupole and octupole terms) of significantly greater magnitude as previously described. The receive resonator is configured to extract power from the generated electric field (E) via resonant electric field coupling. The wireless power transfer system 2600 operated in the same manner as the previously described wireless power transfer system 900.

Figure 31:
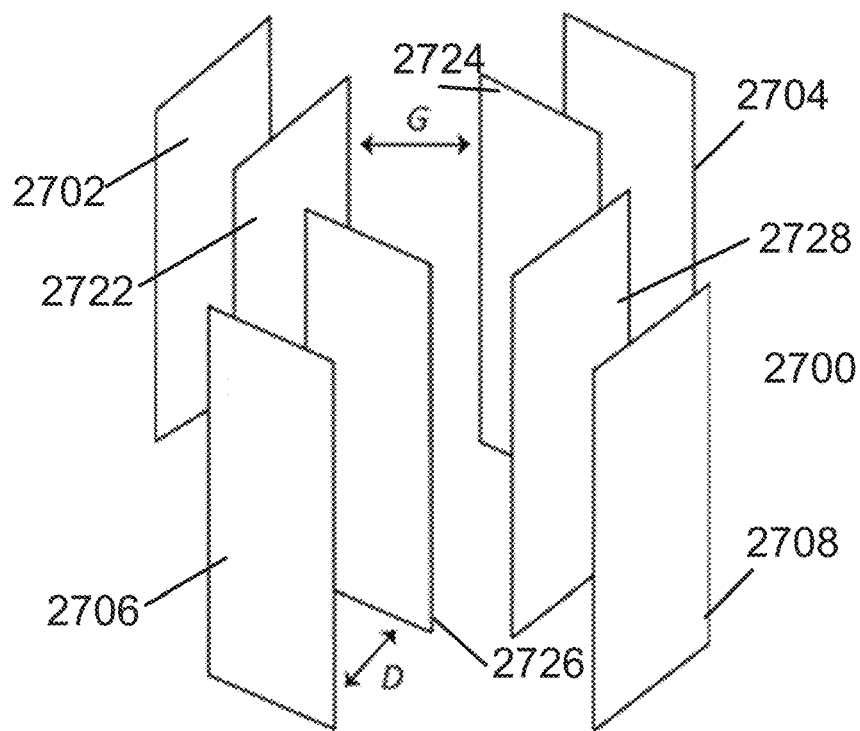
FIG. 31 is a perspective view of another embodiment of a portion of the wireless power transfer system of FIG. 8A.

While a particular wireless power transfer system 900 has been described, one of skill in the art will appreciate that other configurations are possible. FIG. 31 shows a portion of another embodiment of a wireless power transfer system generally identified by reference numeral 2700.

The wireless power transfer system 2700 comprises a transmitter comprising a power source (not shown) electrically connected to a transmit resonator that comprises four transmit electrodes and connectors (not shown). The system 2700 further comprises a load (not shown) electrically connected to a receive resonator that comprises four receive electrodes and connectors (not shown). The transmit resonator further comprises at least one inductor (not shown) electrically connected to the four transmit electrodes. The receive resonator further comprises at least one inductor (not shown) electrically connected to the four receive electrodes.

The transmit electrodes are planar plate electrodes. The transmit electrodes are generally rectangular. Adjacent transmit electrodes are perpendicular to each other. The transmit electrodes enclose a cuboid volume. The receive electrodes are within the enclosed cuboid volume formed by the transmit electrodes. The transmit electrodes and the receive electrodes are separated by a distance (D).

The transmit electrodes comprise a first transmit electrode 2702, a second transmit electrode 2704, a third transmit electrode 2706 and a fourth transmit electrode 2708. The first transmit electrode 2702 is opposite the fourth transmit electrode 2708. The first transmit electrode 2702 and the fourth transmit electrode 2708 have opposed major faces.

The first transmit electrode 2702 and the fourth transmit electrode 2708 are positively charged. The second transmit electrode 2704 is opposite the third transmit electrode 2706. The second transmit electrode 2704 and the third transmit electrode 2706 have opposed major faces. The second transmit electrode 2704 and the third transmit electrode 2706 are negatively charged.

The receive electrodes are planar plate electrodes. The receive electrodes are generally rectangular. Adjacent receive electrodes are perpendicular to each other. The receive electrodes enclose a cuboid volume. Adjacent receive electrodes are separated by a gap (G).

The receive electrodes comprise a first receive electrode 2722, a second receive electrode 2724, a third receive electrode 2726 and a fourth receive electrode 2728. The first receive electrode 2722 is opposite the fourth receive electrode 2728. The first receive electrode 2722 and the fourth receive electrode 2728 have opposed major faces. The first receive electrode 2722 and the fourth receive electrode 2728 are negatively charged. The second receive electrode 2724 is opposite the third receive electrode 2726. The second receive electrode 2724 and the third receive electrode 2726 have opposed major faces. The second receive electrode 2724 and the third receive electrode 2726 are positively charged.

The transmit resonator is configured to generate an electric field (E) having a dipole term, the term proportional to the inverse of the cube of the distance (r), of negligible magnitude (near or at zero) and higher order terms (e.g. quadrupole and octupole terms) of significantly greater magnitude as previously described. The receive resonator is configured to extract power from the generated electric field (E) via resonant electric field coupling. The wireless power transfer system 2700 operated in the same manner as the previously described wireless power transfer system 900.

Figure 32:
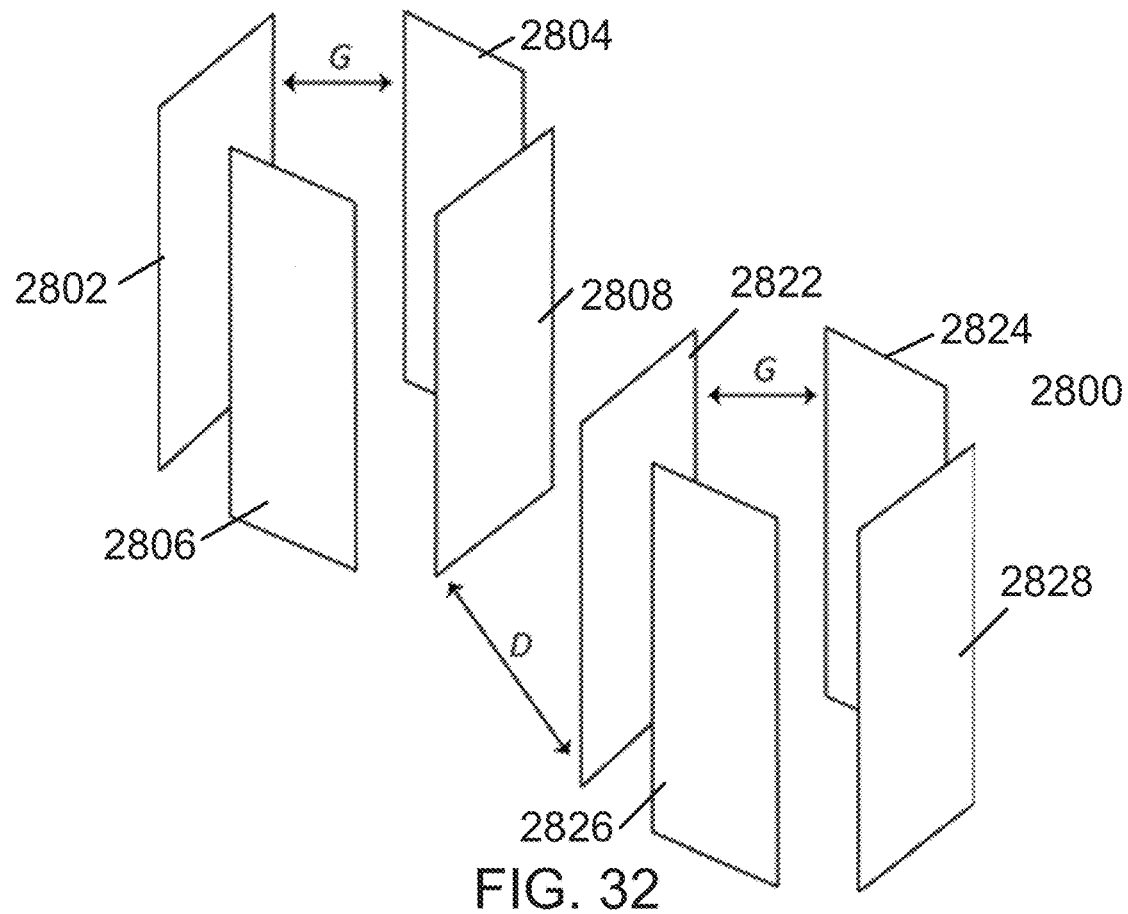
FIG. 32 is a perspective view of another embodiment of a portion of the wireless power transfer system of FIG. 8A.

While a particular wireless power transfer system 2700 has been described, one of skill in the art will appreciate that other configurations are possible. FIG. 32 shows a portion of another embodiment of a wireless power transfer system generally identified by reference numeral 2800.

The wireless power transfer system 2800 comprises a transmitter comprising a power source (not shown) electrically connected to a transmit resonator that comprises four transmit electrodes and connectors (not shown). The system 2800 further comprises a load (not shown) electrically connected to a receive resonator that comprises four receive electrodes and connectors (not shown). The transmit resonator further comprises at least one inductor (not shown) electrically connected to the four transmit electrodes. The receive resonator further comprises at least one inductor (not shown) electrically connected to the four receive electrodes. The transmit and receive electrodes are identical to the transmit and receive electrodes of the wireless power transfer system 2700 unless otherwise stated.

The transmit electrodes are planar plate electrodes. The transmit electrodes are generally rectangular. Adjacent transmit electrodes are perpendicular to each other. The transmit electrodes enclose a cuboid volume. Adjacent transmit electrodes are separated by a gap (G). The transmit electrodes and the receive electrodes are separated by a distance (D).

In this embodiment, the transmit electrodes comprise a first transmit electrode 2802, a second transmit electrode 2804, a third transmit electrode 2806 and a fourth transmit electrode 2808. The first transmit electrode 2802 is opposite the fourth transmit electrode 2808. The first transmit electrode 2802 and the fourth transmit electrode 2808 have opposed major faces. The second transmit electrode 2804 is opposite the third transmit electrode 2806. The second transmit electrode 2804 and the third transmit electrode 2806 have opposed major faces. The first transmit electrode 2802 and the fourth transmit electrode 2808 are negatively charged. The second transmit electrode 2804 and the third transmit electrode 2806 are positively charged.

In contrast with the wireless power transfer system 2700, the receive electrodes of the wireless power transfer system 2800 are not contained within the cuboid formed by the transmit electrodes. The receive electrodes are planar plate electrodes. The receive electrodes are generally rectangular. Adjacent receive electrodes are perpendicular to each other. The receive electrodes enclose a cuboid volume. Adjacent receive electrodes are separated by a gap (G).

The receive electrodes comprise a first receive electrode 2822, a second receive electrode 2824, a third receive electrode 2826 and a fourth receive electrode 2828. The first receive electrode 2822 is opposite the fourth receive electrode 2828. The first receive electrode 2822 and the fourth receive electrode 2828 have opposed major faces. The second receive electrode 2824 is opposite the third receive electrode 2826. The second receive electrode 2824 and the third receive electrode 2826 have opposed major faces. The first receive electrode 2822 and the fourth receive electrode 2828 are positively charged. The second receive electrode 2824 and the third receive electrode 2826 are negatively charged.

The transmit resonator is configured to generate an electric field (E) having a dipole term, the term proportional to the inverse of the cube of the distance (r), of negligible magnitude (near or at zero) and higher order terms (e.g. quadrupole and octupole terms) of significantly greater magnitude as previously described. The receive resonator is configured to extract power from the generated electric field (E) via resonant electric field coupling. The wireless power transfer system 2800 operated in the same manner as the previously described wireless power transfer system 900.

Figure 33:
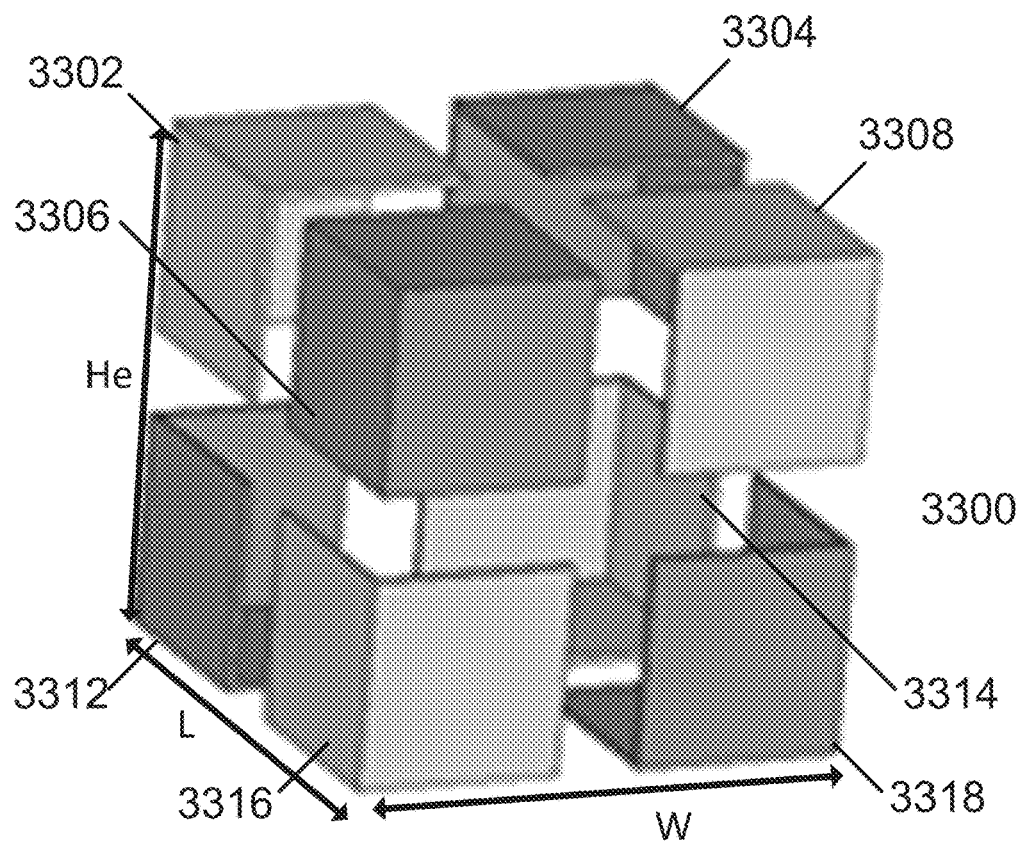
FIG. 33 is a perspective view of another embodiment of a capacitive electrode assembly in accordance with an aspect of the disclosure.

While a particular capacitive electrode assembly 700 has been described, one of skill in the art will appreciate that other configurations are possible. FIG. 33 shows another embodiment of the capacitive electrode assembly generally identified by reference numeral 3300.

The capacitive electrode assembly 3300 forms part of a resonator that is configured to generate or couple with an electric field (E) having a dipole term (the term proportional to the inverse of the cube of the distance (r)) and a quadrupole term (the term proportional to the inverse of the fourth power of the distance (r)) of negligible magnitude (near or at zero) and higher order terms (e.g. octupole term) of significantly greater magnitude as will be described.

The capacitive electrode assembly 3300 comprises eight spaced apart shell electrodes. The capacitive electrode assembly 3300 has a width (W), a length (L) and a height (He). The electrodes of the assembly 3300 are separated by a gap (G). In this embodiment, the periphery of the electrodes forms a cube. Thus, in this embodiment, the width (W), the length (L) and the height (He) are all equal.

In this embodiment, each electrode is generally cube shaped. Each electrode is comprised of three perpendicular planar plates that are joined to form half of a shell of a cube such that all the electrodes enclose a cuboid volume. The electrodes have approximately identical dimensions.

The eight electrodes comprise a first electrode 3302 in the upper back left corner, a second electrode 3304 in the upper back right corner, a third electrode 3306 in the upper front left corner, a fourth electrode 3308 in the upper front right corner, a fifth electrode 3312 in the lower back left corner, a sixth electrode 3314 in the lower back right corner, a seventh electrode 3316 in the lower front left corner and an eighth electrode 3318 in the lower front right corner of the cube formed by the electrodes. The electrodes 3302, 3304, 3306, 3308, 3312, 3314, 3316 and 3318 have three mirror symmetry planes, four-fold rotational symmetry and a mirror plane, or two mirror planes and a 90-degree screw axis. In this embodiment, the axes are the x-axis, the y-axis and the z-axis. In this embodiment, the first electrode 3302, fourth electrode 3308, sixth electrode 3314 and seventh electrode 3316 are connected by connectors (not shown) to form a first electrode set. The second electrode 3304, third electrode 3306, fifth electrode 3312 and eighth electrode 3318 are connected by connectors (not shown) to form a second electrode set.

The first electrode set and the associated connectors are all positively charged. The second electrode set and the associated connectors are all negatively charged.

As previously stated, the capacitive electrode assembly 700 forms part of a resonator that is configured to generate or couple with an electric field (E) having a dipole term (the term proportional to the inverse of the cube of the distance (r)) of negligible magnitude (near or at zero) and higher order terms (e.g. quadrupole term) of significantly greater magnitude. In this embodiment, the capacitive electrode assembly 3300 forms part of a transmit resonator. The transmit resonator is configured to generate an electric field (E) having a dipole term (the term proportional to the inverse of the cube of the distance (r)) and a quadrupole term (the term proportional to the inverse of the fourth power of the distance (r)) of negligible magnitude (near or at zero) and higher order terms (e.g. octupole term) of significantly greater magnitude to produce a localized electric field (E).

The transmit resonator comprises the capacitive electrode assembly 3300. The first electrode set of the assembly 3300 is electrically connected to a first inductor (not shown). The second electrode set of the assembly 3300 is electrically connected to a second inductor (not shown). The first electrode 3302 which is positively charged, the second electrode 3304 which is negatively charged, the third electrode 3306 which is negatively charged and the fourth electrode 3308 which is positively charged, and the first inductor form a first quadrupole resonator. The fifth electrode 3312 which is negatively charged, the sixth electrode 3314 which is positively charged, the seventh electrode 3316 which is positively charged and the eighth electrode 3318 which is negatively charged, and the second inductor form a second quadrupole resonator.

The first quadrupole resonator is configured to generate an electric field (E) having a dipole term and a quadrupole term in a first direction. The second quadrupole resonator is configured to generate an electric field (E) having a dipole term and a quadrupole term in a second direction. The first and second directions are opposite as the charge distribution of the quadrupole resonators is opposed.

The dipole terms of the electric fields (E) generated by the first and second quadrupole resonators are equal in magnitude as the electrodes 3302, 3304, 3306, 3308, 3312, 3314, 3316 and 3318 and the associated connectors have identical (or near identical) dimensions. Thus, the dipole terms of the electric fields (E) generated by the quadrupole resonators are equal in magnitude and opposite in direction resulting in a net zero dipole term of the net electric field (E) generated by the transmit resonator comprising the capacitive electrode assembly 3300.

Similarly, the quadrupole terms of the electric fields (E) generated by the first and second quadrupole resonators are equal in magnitude as the electrodes 3302, 3304, 3306, 3308, 3312, 3314, 3316 and 3318 and the associated connectors have identical (or near identical) dimensions. Thus, the quadrupole terms of the electric fields (E) generated by the quadrupole resonators are equal in magnitude and opposite in direction resulting in a net zero quadrupole term of the net electric field (E) generated by the transmit resonator comprising the capacitive electrode assembly 3300.

As the net dipole and quadrupole terms of the electric field (E) generated by the transmit resonator comprising the capacitive electrode assembly 3300 are approximately zero, the total electric field (E) at a fringing field region is approximately zero. The fringing field region is at a distance (r) from the centre of the capacitive electrode assembly 3300 that is greater than the wavelength ($\lambda$) of the electric field (E) generated by the transmit resonator comprising the capacitive electrode assembly 3300.

While a transmit resonator comprising the capacitive electrode assembly 3300 is described, one of skill in the art will appreciate that the capacitive electrode assembly 3300 may form part of a receive resonator.

The transmit resonator comprising the capacitive electrode assembly 3300 may form part of a wireless power transfer system. Such a wireless power transfer system operates in the same manner as wireless power transfer system 900 unless otherwise stated. A wireless power transfer system comprising a transmit resonator comprising the capacitive electrode assembly 3300 and a receive resonator comprising the capacitive electrode assembly 3300 operates to transfer power via electric field coupling as previously described in relation to the wireless power transfer system 900. In this embodiment, the transmit resonator comprising the capacitive electrode assembly 3300 is configured to generate an electric field (E) that contains a dipole term and a quadrupole term of negligible magnitude, and higher order terms (e.g. octupole term) of significantly greater magnitude to produce a localized electric field (E).

Figure 34:
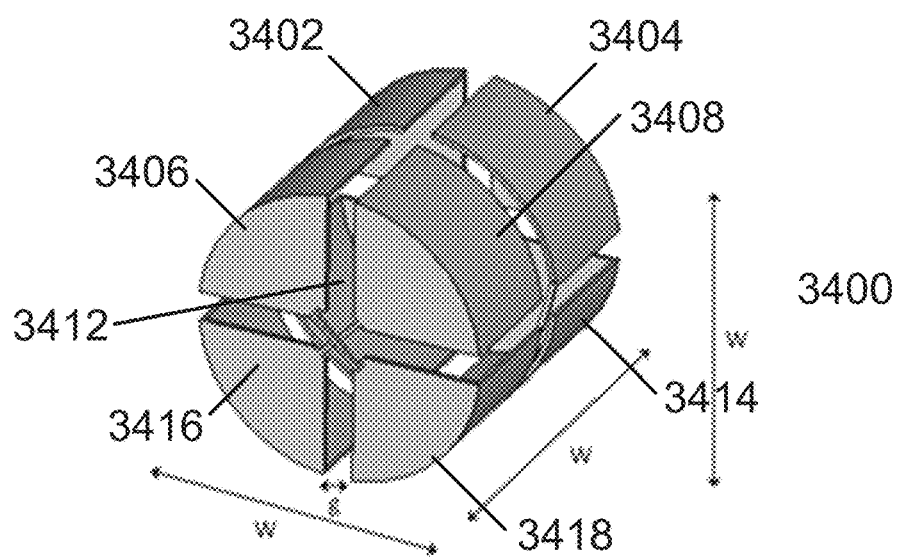
FIG. 34 is a perspective view of another embodiment of the capacitive electrode assembly of FIG. 33.

While a particular capacitive electrode assembly 3300 has been described, one of skill in the art will appreciate that other configurations are possible. FIG. 34 shows another embodiment of the capacitive electrode assembly generally identified by reference numeral 3400. The capacitive electrode assembly 3400 is identical to the previously described capacitive electrode assembly 3300 unless otherwise stated.

The capacitive electrode assembly 3400 comprises eight spaced apart shell electrodes. The capacitive electrode assembly 3400 has a width, a length and a height. In this embodiment, the width, the length and the height are all equal to a value (W). The electrodes of the assembly 3400 are separated by a gap (G). In this embodiment, the outer periphery of the electrodes forms a cylinder. The inner periphery of the electrode forms a cylinder.

In this embodiment, each electrode is generally a cylindrical segment. Each electrode is comprised of two plates joined to form each cylindrical segment. The electrodes have approximately identical dimensions.

The eight electrodes comprise a first electrode 3402 in the upper back left corner, a second electrode 3404 in the upper back right corner, a third electrode 3406 in the upper front left corner, a fourth electrode 3408 in the upper front right corner, a fifth electrode 3412 in the lower back left corner, a sixth electrode 3414 in the lower back right corner, a seventh electrode 3416 in the lower front left corner and an eighth electrode 3418 in the lower front right corner of the cylinder formed by the electrodes. The electrodes 3402, 3404, 3406, 3408, 3412, 3414, 3416 and 3418 are orthogonal and symmetric in three axes. In this embodiment, the axes are the x-axis, the y-axis and the z-axis.

While particular capacitive electrode assemblies have been described, one of skill in the art will appreciate that other configurations are possible. In another embodiment, a previously described capacitive electrode assembly further comprises a passive electrode as described in U.S. patent application Ser. No. 16/138,344 filed on Sep. 21, 2018, the relevant portions of which are incorporated herein by reference. The use of a passive electrode may prevent excessive energy emissions and maintain safe levels of specific absorption rate (SAR), while protecting a wireless power transfer system comprising the capacitive electrode assembly from external environmental factors, such as nearby conductors or dielectrics which can interfere with and detune the wireless power transfer system.

Although embodiments have been described above and are shown in the accompanying drawings, it will be appreciated by one of skill in the art that variations and modifications may be made without departing from the scope as defined by the appended claims, and the scope of the claims should be given the broadest interpretation consistent with the specification as a whole.

What is claimed is:

1. A resonator comprising:
    at least two inductors; and
    at least four capacitive electrodes electrically connected to the inductors, and wherein the capacitive electrodes and the inductors are configured to resonate and:
        generate or couple with an electric field, wherein the electrodes have either four fold mirror or rotational symmetry, wherein the electric field has a dipole term of negligible magnitude.

2. The resonator of claim 1, wherein two electrodes have a positive charge while two other electrodes have a negative charge.

3. The resonator of claim 2, wherein a first electrode with the positive charge and a second electrode with the negative charge form a first dipole, and wherein a third electrode with the negative charge and a fourth electrode with the positive charge form a second dipole.

4. The resonator of claim 3, wherein the first dipole is configured to generate or couple with an electric field having a dipole term in a first direction, wherein the second dipole is configured to generate or couple with an electric field having a dipole term in a second direction, and wherein the first and second directions are opposite.

5. The resonator of claim 4, wherein the electric field having the dipole term in the first direction is equal in magnitude to the electric field having the dipole term in the second direction.

6. The resonator of claim 1, wherein the electrodes are planar square electrodes.

7. The resonator of claim 1, wherein the electrodes form a square at their peripheries.

8. The resonator of claim 1, wherein two electrodes are connected by a diagonal first connector and two other electrodes are connected by a diagonal second connector.

9. A wireless power transfer system comprising the resonator of claim 1.

10. A system comprising:
    a transmitter comprising:
        a transmit resonator comprising:
            at least two inductors; and
            at least four capacitive electrodes electrically connected to the inductors, wherein the capacitive electrodes and the inductors are configured to resonate and generate an electric field having a dipole term of negligible magnitude; and a receiver comprising:
  a receive resonator comprising:
    at least two inductors; and
    at least four capacitive electrodes electrically connected to the inductors, wherein the capacitive electrodes and the inductors are configured to resonate and couple with the generated electric field having the dipole term of negligible magnitude to extract power.

11. The system of claim 10, wherein the transmitter further comprises a radiofrequency (RF) power source electrically connected to the transmit resonator.

12. The system of claim 11, wherein the RF power source is a differential power source.

13. The system of claim 12, wherein:
  a first capacitive electrode of the transmit resonator is electrically connected to a first terminal of the differential power source via a first inductor of the transmit resonator,
  a second capacitive electrode of the transmit resonator is electrically connected to a second terminal of the differential power source via a second inductor of the transmit resonator,
  a third capacitive electrode of the transmit resonator is electrically connected to the second terminal of the differential power source via a third inductor of the transmit resonator, and
  a fourth capacitive electrode of the transmit resonator is electrically connected to the first terminal of the differential power source via a fourth inductor of the transmit resonator.

14. The system of claim 13, wherein a voltage applied to the first and fourth capacitive electrodes is opposite in sign and equal in magnitude to a voltage applied to the second and third capacitive electrodes.

15. The system of claim 12, wherein:
  a first capacitive electrode of the transmit resonator is electrically connected to a fourth capacitive electrode of the transmit resonator via a first connector,
  a third capacitive electrode of the transmit resonator is electrically connected to a second capacitive electrode of the transmit resonator via a second connector,
  the first capacitive electrode is electrically connected to a first terminal of the differential power source via a first inductor of the transmit resonator, and
  the third capacitive electrode is electrically connected to a second terminal of the differential power source via a second inductor of the transmit resonator.

16. The system of claim 15, wherein a voltage applied to the first and fourth capacitive electrodes is opposite in sign and equal in magnitude to a voltage applied to the second and third capacitive electrodes.

17. The system of claim 10, wherein the receiver further comprises a load electrically connected to the receive resonator.

18. The system of claim 17, wherein:
  a first capacitive electrode of the receive resonator is electrically connected to a first terminal of the load via a first inductor of the receive resonator,
  a second capacitive electrode of the receive resonator is electrically connected to a second terminal of the load via a second inductor of the receive resonator,
  a third capacitive electrode of the receive resonator is electrically connected to the second terminal of the load via a third inductor of the receive resonator, and
  a fourth capacitive electrode of the receive resonator is electrically connected to the first terminal of the load via a fourth inductor of the receive resonator.

19. The system of claim 18, wherein a voltage applied to the first and fourth capacitive electrodes is opposite in sign and equal in magnitude to a voltage applied to the second and third capacitive electrodes.

20. The system of claim 17, wherein:
  a first capacitive electrode of the receive resonator is electrically connected to a fourth capacitive electrode of the receive resonator via a first connector,
  a third capacitive electrode of the receive resonator is electrically connected to a second capacitive electrode of the receive resonator via a second connector,
  the first capacitive electrode is electrically connected to a first terminal of the load via a first inductor of the receive resonator, and
  the third capacitive electrode is electrically connected to a second terminal of the load via a second inductor of the receive resonator.

21. The system of claim 20, wherein a voltage applied to the first and fourth capacitive electrodes is opposite in sign and equal in magnitude to a voltage applied to the second and third capacitive electrodes.

22. A capacitive electrode assembly comprising:
  at least four capacitive electrodes configured to resonate with inductors and generate or couple with an electric field, the electrodes having either four fold mirror or rotational symmetry, wherein the electric field has a dipole term of negligible magnitude.

23. A resonator comprising:
  the capacitive electrode assembly of claim 22; and
  at least two inductors configured to resonate with the electrodes and generate or couple with an electric field.

24. A resonator comprising:
  at least two inductors; and
  at least eight capacitive electrodes electrically connected to the inductors, wherein the capacitive electrodes have three mirror symmetry planes, four-fold rotational symmetry and a mirror plane, or two mirror planes and a 90-degree screw axis, and wherein the electrodes and the inductors are configured to resonate, wherein the electrodes and inductors resonate to generate or couple with an electric field having a dipole term and a quadrupole term of negligible magnitude.

25. A wireless power transfer system comprising the resonator of claim 24.

* * * * *